(12) United States Patent
Kim et al.

(10) Patent No.: US 12,354,225 B2
(45) Date of Patent: Jul. 8, 2025

(54) METHOD AND ELECTRONIC DEVICE FOR DISPLAYING AUGMENTED REALITY CONTENT BASED ON AMBIENT ILLUMINANCE

(71) Applicant: SAMSUNG ELECTRONICS CO., LTD., Suwon-si (KR)

(72) Inventors: Myungkyu Kim, Suwon-si (KR); Taehun Ko, Suwon-si (KR); Jinseon Yoo, Suwon-si (KR); Kawon Cheon, Suwon-si (KR); Hoon Han, Suwon-si (KR); Yunjeong Ji, Suwon-si (KR); Jonghyuk Bae, Suwon-si (KR); Hongyeul Eom, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 243 days.

(21) Appl. No.: 18/108,187

(22) Filed: Feb. 10, 2023

(65) Prior Publication Data

US 2023/0252738 A1    Aug. 10, 2023

Related U.S. Application Data

(63) Continuation of application No. PCT/KR2022/019906, filed on Dec. 8, 2022.

(30) Foreign Application Priority Data

Feb. 10, 2022 (KR) .................. 10-2022-0017273
Feb. 17, 2022 (KR) .................. 10-2022-0021072

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/013* (2013.01); *G06F 3/14* (2013.01); *G06T 7/90* (2017.01);
(Continued)

(58) Field of Classification Search
CPC .......... G06F 3/005; G06F 3/011; G06F 3/013; G06F 3/0484; G06F 3/14; G06F 3/1431;
(Continued)

(56) References Cited

U.S. PATENT DOCUMENTS 10,612,908 B2    4/2020  Dryer et al.
2014/0168056 A1*  6/2014  Swaminathan ...... G06V 30/142
                                                                   345/156
(Continued)

FOREIGN PATENT DOCUMENTS

JP       2018-036993      3/2018
JP       6351394          7/2018
(Continued)

OTHER PUBLICATIONS

Search Report dated Mar. 15, 2023 issued in International Patent Application No. PCT/KR2022/019906.

*Primary Examiner* — Xilin Guo
(74) *Attorney, Agent, or Firm* — NIXON & VANDERHYE P.C.

(57) ABSTRACT

An electronic device includes: a sensor module, a display module comprising a main display and a sub-display, a memory configured to store computer-executable instructions, and a processor configured to execute the instructions by accessing the memory, wherein the instructions, when executed by the processor, cause the processor to: identify at least one real object displayed through the main display, select one real object from among the identified at least one real object as a target object, control the sensor module to
(Continued)

measure ambient illuminance of the electronic device, determine a visibility level of the electronic device based on the ambient illuminance of the electronic device, and display at least one augmented reality (AR) content corresponding to the selected target object on at least one of the main display or the sub-display based on the determined visibility level.

20 Claims, 16 Drawing Sheets

(51) Int. Cl.
*G06F 3/14* (2006.01)
*G06T 7/90* (2017.01)
*G06V 10/25* (2022.01)
*G06V 10/60* (2022.01)

(52) U.S. Cl.
CPC .............. *G06V 10/25* (2022.01); *G06V 10/60* (2022.01); *G06T 2207/10024* (2013.01); *G06V 2201/07* (2022.01)

(58) Field of Classification Search
CPC ........... G06F 3/147; G06F 2203/04803; G06T 19/006; G06T 7/90; G06T 2207/10024; G06T 5/90; G06T 1/20; G06V 10/143; G06V 10/25; G06V 10/60; G06V 20/20; G06V 20/63; G06V 40/193; G06V 40/28; G06V 2201/07; G06V 10/141; G06V 10/56; G06V 10/14; G09G 3/003; G09G 2354/00; G09G 2360/144; G09G 2320/0626; G09G 2320/0666

See application file for complete search history.

(56) References Cited

U.S. PATENT DOCUMENTS

| | | |
|---|---|---|
| 2019/0340799 A1 | 11/2019 | Dryer et al. |
| 2019/0349575 A1* | 11/2019 | Knepper .................. G06F 3/012 |
| 2020/0342660 A1 | 10/2020 | Stachniak et al. |
| 2021/0049361 A1 | 2/2021 | Drake et al. |
| 2021/0065439 A1 | 3/2021 | Stafford et al. |
| 2021/0141229 A1* | 5/2021 | Mathur .............. G02B 27/0093 |

FOREIGN PATENT DOCUMENTS

| | | |
|---|---|---|
| KR | 10-0618816 | 8/2006 |
| KR | 10-2016-0015775 | 2/2016 |
| KR | 10-2016-0016540 | 2/2016 |
| KR | 10-1635594 | 7/2016 |
| KR | 10-2019-0077255 | 7/2019 |
| KR | 10-2020-0031666 | 3/2020 |
| KR | 10-2090077 | 3/2020 |
| KR | 10-2021-0019826 | 2/2021 |
| WO | 2017/167060 | 10/2017 |

* cited by examiner

METHOD AND ELECTRONIC DEVICE FOR DISPLAYING AUGMENTED REALITY CONTENT BASED ON AMBIENT ILLUMINANCE

CROSS-REFERENCE TO RELATED APPLICATIONS

This application is a continuation of International Application No. PCT/KR2022/019906 designating the United States, filed on Dec. 8, 2022, at the Korean Intellectual Property Receiving Office and claiming priority to Korean Patent Application No. 10-2022-0017273, filed on Feb. 10, 2022, at the Korean Intellectual Property Office, and to Korean Patent Application No. 10-2022-0021072, filed on Feb. 17, 2022, at the Korean Intellectual Property Office, the disclosures of all of which are incorporated by reference herein in their entireties.

BACKGROUND

1. Field

The disclosure relates to a method and an electronic device for displaying augmented reality (AR) content based on ambient illuminance.

2. Description of Related Art

Various wearable AR devices that can be directly worn on the body are being developed. As a wearable AR device is directly worn on the body, mobility and portability may be improved. A wearable AR device may be a next-generation device capable of recognizing a virtual image output on a display as well as on an outside background. For example, a head-mounted display (HMD) is a type of wearable AR device that is being developed. The HMD may be in the form of glasses or a helmet, and may be mounted on a part of the body (e.g., the head of a user) to display an image. A wearable AR device may provide an immersive experience to a user by displaying AR content corresponding to text or an image on a display.

When ambient illuminance of an electronic device increases, visibility of AR content corresponding to a real object displayed on a main display may decrease. An electronic device may change an AR content corresponding to a target object to be displayed on each of a main display and a sub-display when the ambient illuminance of the electronic device is changed.

When the ambient illuminance increases, the electronic device display only an outline and a bounding box for identifying the real object on the main display affected by the ambient illuminance, and display the AR content corresponding to the target object on the sub-display that is not affected by the ambient illuminance.

SUMMARY

Embodiments of the disclosure provide an electronic device that may select a target object from among at least one real object identified by tracking a gaze direction of a user.
Embodiments of the disclosure provide an electronic device that may detect an ambient color of the electronic device and display an outline and a bounding box corresponding to a real object in a color with high visibility compared to the detected ambient color.

According to an embodiment, an electronic device includes: a sensor module, a display module comprising a main display and a sub-display, a memory configured to store computer-executable instructions, and a processor configured to execute the instructions by accessing the memory, wherein the instructions, when executed by the processor, cause the processor to: identify at least one real object displayed through the main display, select one real object from among the identified at least one real object as a target object, control the sensor module to measure ambient illuminance of the electronic device, determine a visibility level of the electronic device based on the ambient illuminance of the electronic device, and display at least one augmented reality (AR) content corresponding to the selected target object on at least one of the main display or the sub-display based on the determined visibility level.

According to an embodiment, a method implemented by a processor includes: identifying at least one real object displayed through a main display, selecting one real object from among the identified at least one real object as a target object, controlling the sensor module to measure ambient illuminance of the electronic device, determining a visibility level of an electronic device based on ambient illuminance of the electronic device, and displaying at least one AR content corresponding to the target object on at least one of the main display or a sub-display based on the determined visibility level.

The electronic device according to various example embodiments may determine whether to display AR content corresponding to a target object on the main display or the sub-display based on a visibility level of the electronic device, thereby securing high visibility of the AR content corresponding to the target object.

The electronic device according to various example embodiments may select one real object as the target object from among at least one identified real object based on a gaze direction of a user and display the AR content corresponding to the target object on a display, thereby providing an efficient user experience in which information related to the real object the user is viewing is provided.

The electronic device according to various example embodiments may increase visibility of the real object by displaying an outline and a bounding box corresponding to the real object in a color with high visibility compared to an ambient color of the electronic device on the main display.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
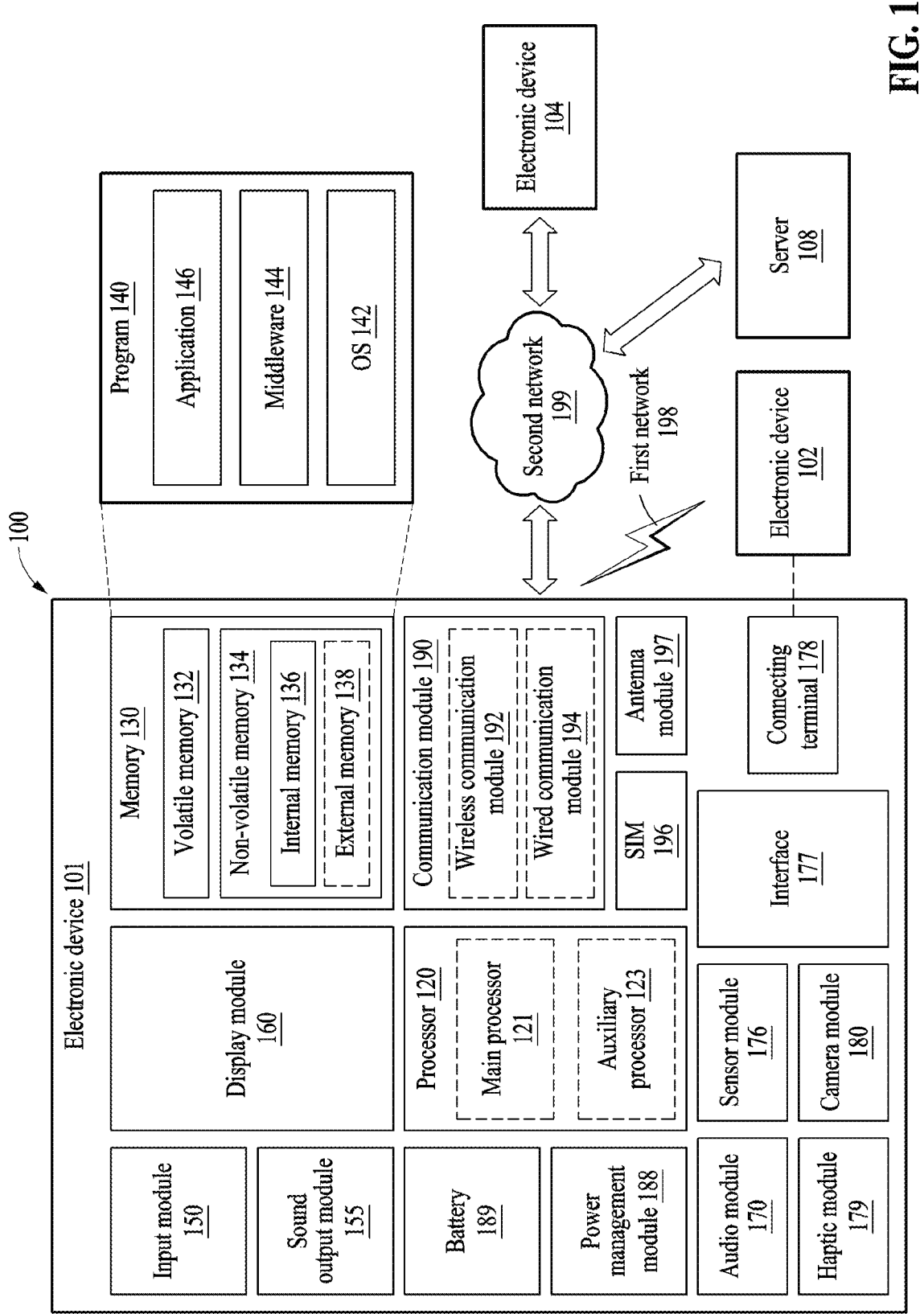
FIG. 1 is a block diagram illustrating an example electronic device in a network environment according to various embodiments.

Hereinafter, various example embodiments will be described in greater detail with reference to the accompanying drawings. When describing the embodiments with reference to the accompanying drawings, like reference numerals refer to like elements and a repeated description related thereto may not be repeated.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added to the electronic device 101. In various embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one of the components (e.g., the display module 160, the sensor module 176, or the communication module 190) of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An AI model may be generated through machine learning. Such machine learning may be performed by, for example, the electronic device 101, in which artificial intelligence is performed, or performed via a separate server (e.g., the server 108). Learning algorithms may include, but are not limited to, for example, supervised learning, unsupervised learning, semi-supervised learning, or reinforcement learning algorithms. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively, include a software structure other than the hardware structure.

The memory 130 may store various pieces of data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to an embodiment, the display module 160 may include a touch sensor adapted to sense a touch, or a pressure sensor adapted to measure an intensity of a force incurred by the touch.

The audio module 170 may convert a sound into an electrical signal or vice versa. According to an embodiment, the audio module 170 may obtain the sound via the input module 150 or output the sound via the sound output module 155 or an external electronic device (e.g., the electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, an ultra-wide band (UWB) sensor, a grip sensor, a proximity sensor, a color sensor, an IR sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus which may be recognized by a user via their tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support direct (e.g., wired) communication or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form a mmWave antenna module. According to an embodiment, the mmWave antenna module may include a PCB, an RFIC disposed on a first surface (e.g., a bottom surface) of the PCB, or adjacent to the first surface of the PCB and capable of supporting a designated high-frequency band (e.g., a mmWave band), and a plurality of antennas (e.g., array antennas) disposed on a second surface (e.g., a top or a side surface) of the PCB, or adjacent to the second surface of the PCB and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer a result of the performing to the electronic device 101. The electronic device 101 may provide the result, with or without further processing of the result, as at least part of a response to the request. To that end, cloud computing, distributed computing, mobile edge computing (MEC), or client-server computing technology may be used, for example. The electronic device 101 may provide ultra low-latency services using, e.g., distributed computing or MEC. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
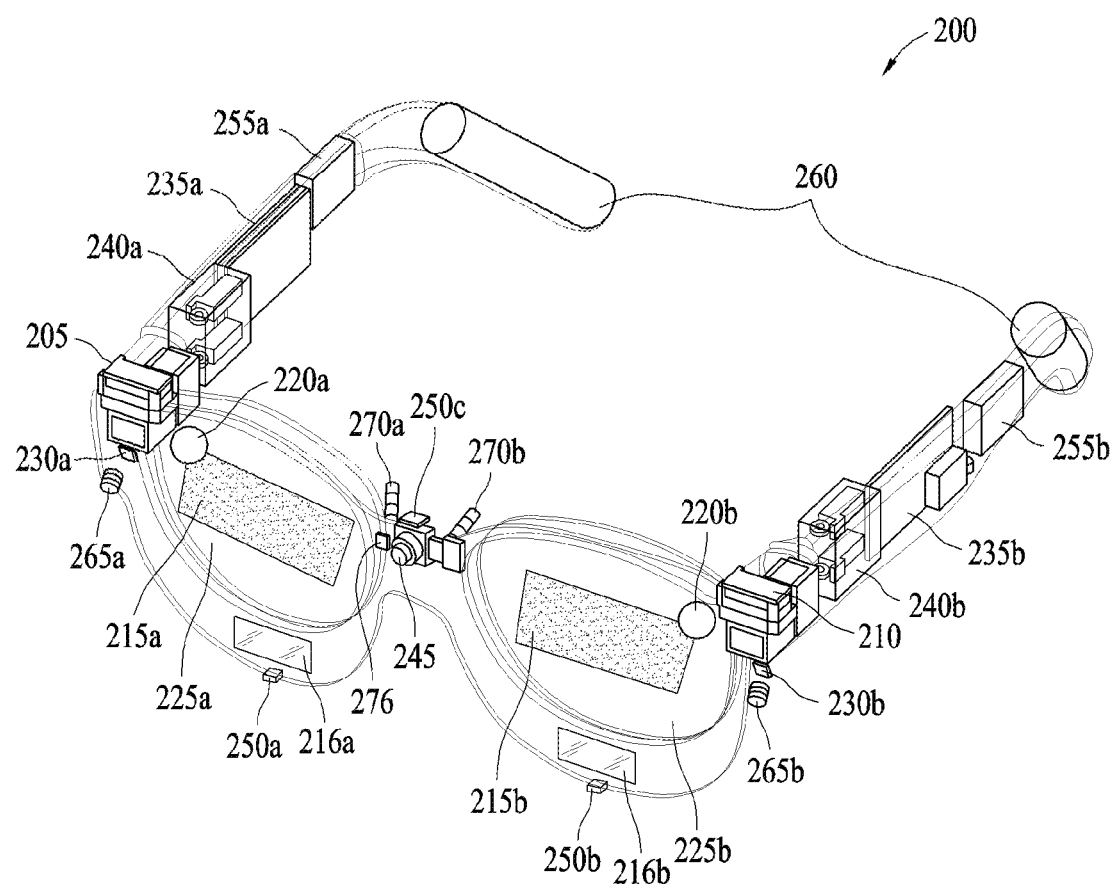
FIG. 2 is a perspective view illustrating an example structure of a wearable augmented reality (AR) device according to various embodiments.

FIG. 2 is a perspective view illustrating an example structure of an example wearable augmented reality (AR) device according to various embodiments.

Referring to FIG. 2, a wearable AR device 200 (e.g., the electronic device 101 of FIG. 1) may be worn on a face of a user to provide the user with an image associated with an AR service and/or a virtual reality (VR) service.

In an embodiment, the wearable AR device 200 may include a first display 205, a second display 210, screen display portions 215a and 215b, input optical members 220a and 220b, a first transparent member 225a, a second transparent member 225b, lighting units 230a and 230b, a first PCB 235a, a second PCB 235b, a first hinge 240a, a second hinge 240b, first cameras 265a and 265b, a plurality of microphones (e.g., a first microphone 250a, a second microphone 250b, and a third microphone 250c), a plurality of speakers (e.g., a first speaker 255a, and a second speaker 255b), a battery 260, second cameras 270a and 270b, and a third camera 245.

In an embodiment, a display (e.g., the first display 205 and the second display 210) may include, for example, a liquid crystal display (LCD), a digital mirror device (DMD), or a liquid crystal on silicon (LCoS) display, an organic light-emitting diode (OLED) display, a micro light-emitting diode (micro-LED) display, or the like. Although not shown, when the display is one of an LCD, a DMD, or an LCoS, the wearable AR device 200 may include a light source configured to irradiate light to a screen output area of the display. In an embodiment, when the display is capable of generating light by itself, for example, when the display is either an OLED or a micro-LED, the wearable AR device 200 may provide a virtual image of relatively high quality to the user even though a separate light source is not included. In an embodiment, when the display is implemented as an OLED display or a micro LED display, a light source may be unnecessary, and accordingly the wearable AR device 200 may be reduced in weight. Hereinafter, a display capable of generating light by itself may be referred to as a "self-luminous display", and it may be assumed that any display described is a self-luminous display.

A display (e.g., the first display 205 and the second display 210) according to an embodiment may include at least one micro-LED. For example, the micro-LED may express red (R), green (G), and blue (B) by emitting light by itself, and a single chip may implement a single pixel (e.g., one of R, G, and B pixels) because a micro-LED is relatively small in size (e.g., 100 µm or less). Accordingly, the display may provide a high resolution without a backlight unit (BLU), when the display is implemented as a micro-LED display.

However, the embodiments are not limited thereto. A single pixel may include R, G, and B pixels, and a single chip may implement a plurality of pixels including R, G, and B pixels.

In an embodiment, the display (e.g., the first display 205 and the second display 210) may include a display area made up of pixels for displaying a virtual image, and light-receiving pixels (e.g., photo sensor pixels) disposed among the pixels, that receive the light reflected from eyes, convert the reflected light into electrical energy, and output light.

In an embodiment, the wearable AR device 200 may detect a gaze direction (e.g., a movement of a pupil) of the user through the light-receiving pixels. For example, the wearable AR device 200 may detect and track a gaze direction of a right eye of the user and a gaze direction of a left eye of the user through one or more light-receiving pixel of the first display 205 and one or more light-receiving pixel of the second display 210. The wearable AR device 200 may determine a central position of a virtual image according to the gaze directions of the right eye and the left eye of the user (e.g., directions in which pupils of the right eye and the left eye of the user gaze) detected through the one or more light-receiving pixel.

In an embodiment, the light emitted from the display (e.g., the first display 205 and the second display 210) may reach the screen display portion 215a formed on the first transparent member 225a that faces the right eye of the user, and the screen display portion 215b formed on the second transparent member 225b that faces the left eye of the user, by passing through a lens (not shown) and a waveguide. For example, the light emitted from the display (e.g., the first display 205 and the second display 210) may be reflected from a grating area formed on the input optical members 220a and 220b and the screen display portions 215a and 215b to be delivered to the user's eyes, by being passed through a waveguide. The first transparent member 225a and/or the second transparent member 225b may be formed as, for example, a glass plate, a plastic plate, or a polymer, and may be formed to be transparent or translucent.

In an embodiment, a lens (not shown) may be disposed on a front surface of the display (e.g., the first display 205 and the second display 210). The lens (not shown) may include a concave lens and/or a convex lens. For example, the lens (not shown) may include a projection lens or a collimation lens.

In an embodiment, the screen display portions 215a and 215b or the transparent member (e.g., the first transparent member 225a and the second transparent member 225b) may include a lens including a waveguide and a reflective lens.

In an embodiment, the waveguide may be formed of glass, plastic, or a polymer, and may have a nanopattern formed on one inner surface or on one outer surface, for example, a grating structure of a polygonal or curved shape. According to an embodiment, light incident to one end of the waveguide may be propagated inside a display waveguide by the nanopattern to be provided to the user. In an embodiment, a waveguide including a free-form prism may provide incident light to the user through a reflection mirror. The waveguide may include at least one of at least one diffractive element (e.g., a diffractive optical element (DOE) or a holographic optical element (HOE)) or reflective element (e.g., a reflection mirror). In an embodiment, the waveguide may guide light emitted from the first display 205 and the second display 210 to the eyes of the user, using at least one diffractive element or reflective element included in the waveguide.

According to an embodiment, the diffractive element may include the input optical members 220a and 220b and/or an output optical member (not shown). For example, the input optical members 220a and 220b may be an input grating area, and the output optical member (not shown) may be an output grating area. The input grating area may function as an input terminal to diffract (or reflect) light output from the display (e.g., the first display 205 and the second display 210) (e.g., a micro-LED display) to transmit the light to a transparent member (e.g., the first transparent member 225a and the second transparent member 225b) of the screen display portions 215a and 215b. The output grating area may function as an exit to diffract (or reflect), to the eyes of the user, the light transmitted to the transparent members (e.g., the first transparent member 225a and the second transparent member 225b) of the waveguide.

According to an embodiment, the reflective element may include a total internal reflection optical element or a total internal reflection waveguide for total internal reflection (TIR). For example, TIR, which is one of schemes for inducing light, may form an angle of incidence such that light (e.g., a virtual image) entering through the input grating area is completely reflected from one surface (e.g., a specific surface) of the waveguide, to completely transmit the light to the output grating area.

In an embodiment, the light emitted from the first display 205 and the second display 210 may be guided to the waveguide through the input optical members 220a and 220b. Light traveling in the waveguide may be guided toward the eyes of the user through the output optical member. The screen display portions 215a and 215b may be determined based on the light emitted toward the user's eyes.

In an embodiment, the first cameras 265a and 265b may include a camera used for 3 degrees of freedom (3 DoF) and 6 degrees of freedom (6 DoF) head tracking, hand detection and tracking, and gesture and/or space recognition. For example, the first cameras 265a and 265b may include a global shutter (GS) camera to detect and track a movement of a head and a hand.

For example, a stereo camera may be applied to the first cameras 265a and 265b for head tracking and space recognition, and a camera with the same standard and performance may be applied. A GS camera having excellent performance (e.g., image dragging) may be used as the first cameras 265a and 265b to detect and track a minute movement such as a quick movement of a hand or a finger.

According to an embodiment, a rolling shutter (RS) camera may be used as the first cameras 265a and 265b. The first cameras 265a and 265b may perform a simultaneous localization and mapping (SLAM) function through space recognition and depth capturing for 6 DoF. The first cameras 265a and 265b may perform a user gesture recognition function.

In an embodiment, the second cameras 270a and 270b may be used for detecting and tracking the pupil. The second cameras 270a and 270b may be referred to as a camera for eye-tracking (ET). The second cameras 270a and 270b may track a gaze direction of the user. In consideration of the gaze direction of the user, the wearable AR device 200 may position a center of a virtual image projected on the screen display portions 215a and 215b according to the gaze direction of the user's pupils.

A GS camera may be used as the second cameras 270a and 270b for tracking the gaze direction, in order to detect a pupil and track a rapid pupil movement. The second cameras 270a and 270b may be installed respectively for a right eye and a left eye, and a camera having the same performance and standard may be used as the second cameras 270a and 270b for the right eye and the left eye.

In an embodiment, the third camera 245 may be referred to as a "high resolution (HR)" or a "photo video (PV)", and may include a high-resolution camera. The third camera 245 may include a color camera having functions for obtaining a high-quality image, such as an automatic focus (AF) function and an optical image stabilizer (OIS). The examples are not limited thereto, and the third camera 245 may include a GS camera or an RS camera.

In an embodiment, at least one sensor (e.g., a gyro sensor, an acceleration sensor, a geomagnetic sensor, a UWB sensor, a touch sensor, an illuminance sensor and/or a gesture sensor) and the first cameras 265a and 265b may perform at least one of the functions among 6 DoF head tracking, pose estimation and prediction, gesture and/or space recognition, and SLAM through depth capturing.

In an embodiment, the first cameras 265a and 265b may be classified and used as a camera for head tracking or a camera for hand tracking.

In an embodiment, the lighting units 230a and 230b may be used differently according to positions at which the lighting units 230a and 230b are attached. For example, the lighting units 230a and 230b may be attached together with the first cameras 265a and 265b mounted around a hinge (e.g., the first hinge 240a and the second hinge 240b) that connects a frame and a temple or around a bridge that connects the frame. When capturing is performed using a GS camera, the lighting units 230a and 230b may be used to supplement surrounding brightness. For example, the lighting units 230a and 230b may be used in a dark environment or when it is not easy to detect a subject to be captured due to reflected light and mixing of various light sources.

In an embodiment, the lighting units 230a and 230b attached to the periphery of the frame of the wearable AR device 200 may be an auxiliary means for facilitating detection of an eye gaze direction when the second cameras 270a and 270b capture pupils. When the lighting units 230a and 230b are used as an auxiliary means for detecting a gaze direction, an infrared (IR) LED having an IR wavelength may be included.

In an embodiment, a PCB (e.g., the first PCB 235a and the second PCB 235b) may include a processor (not shown), a memory (not shown), and a communication module (not shown) for controlling components of the wearable AR device 200. The communication module may have the same configuration as the communication module 190 of FIG. 1, and the description of the communication module 190 may equally apply to the communication module. For example, the communication module may support establishing a direct (e.g., wired) communication channel or a wireless communication channel between the wearable AR device 200 and an external electronic device, and support performing communication through the established communication channel. The PCB may transmit an electrical signal to the components of the wearable AR device 200.

The communication module (not shown) may include one or more communication processor(s) including various processing circuitry that is operable independently of the processor and that supports direct (e.g., wired) communication or wireless communication. According to an embodiment, the communication module (not shown) may include a wireless communication module (e.g., a cellular communication module, a short-range wireless communication module, or a global navigation satellite system (GNSS) communication module) or a wired communication module (e.g., a local area network (LAN) communication module, or a power line communication (PLC) module). A corresponding one (not shown) of these communication modules may communicate with the external electronic device via a short-range communication network (e.g., Bluetooth™, wireless-fidelity (Wi-Fi) direct, or infrared data association (IrDA)) or a long-range communication network (e.g., a legacy cellular network, a 5th generation (5G) network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other.

The wireless communication module may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module may support a high-frequency band (e.g., a mmWave band) to achieve, e.g., a high data transmission rate. The wireless communication module may support various technologies for securing performance on a high-frequency band, such as, e.g., beamforming, massive multiple-input and multiple-output (MIMO), full dimensional MIMO (FD-MIMO), an array antenna, analog beamforming, or a large scale antenna.

The wearable AR device 200 may further include an antenna module (not shown). The antenna module may transmit or receive a signal or power to or from the outside (e.g., the external electronic device) of the wearable AR device 200. According to an embodiment, the antenna module may include an antenna including a radiating element including a conductive material or a conductive pattern formed in or on a substrate (e.g., the first PCB 235a and the second PCB 235b). According to an embodiment, the antenna module may include a plurality of antennas (e.g., array antennas).

In an embodiment, a plurality of microphones (e.g., the first microphone 250a, the second microphone 250b, and the third microphone 250c) may convert an external acoustic signal into electrical audio data. The processed audio data may be variously utilized according to a function (or an application being executed) being performed by the wearable AR device 200.

In an embodiment, the plurality of speakers (e.g., the first speaker 255a and the second speaker 255b) may output audio data received from the communication module or stored in the memory.

In an embodiment, one or more battery 260 may be included, and may supply power to components of the wearable AR device 200.

Figure 4:
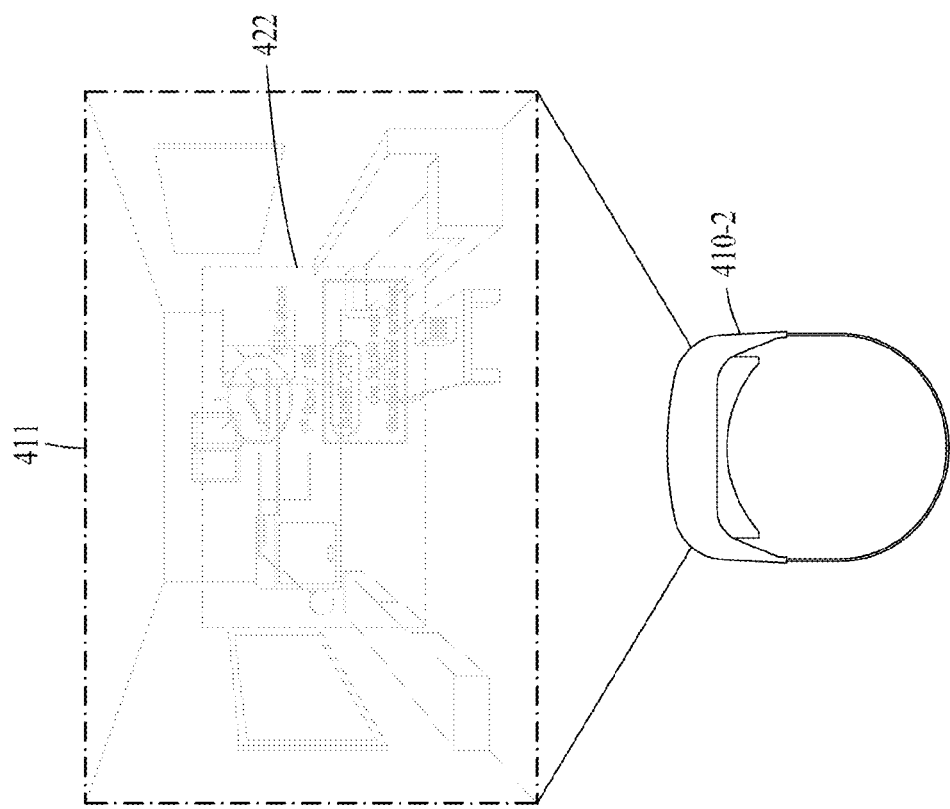
FIG. 4 is a diagram illustrating visibility of AR content displayed on a display according to ambient illuminance of an electronic device according to various embodiments.
Figure 4:
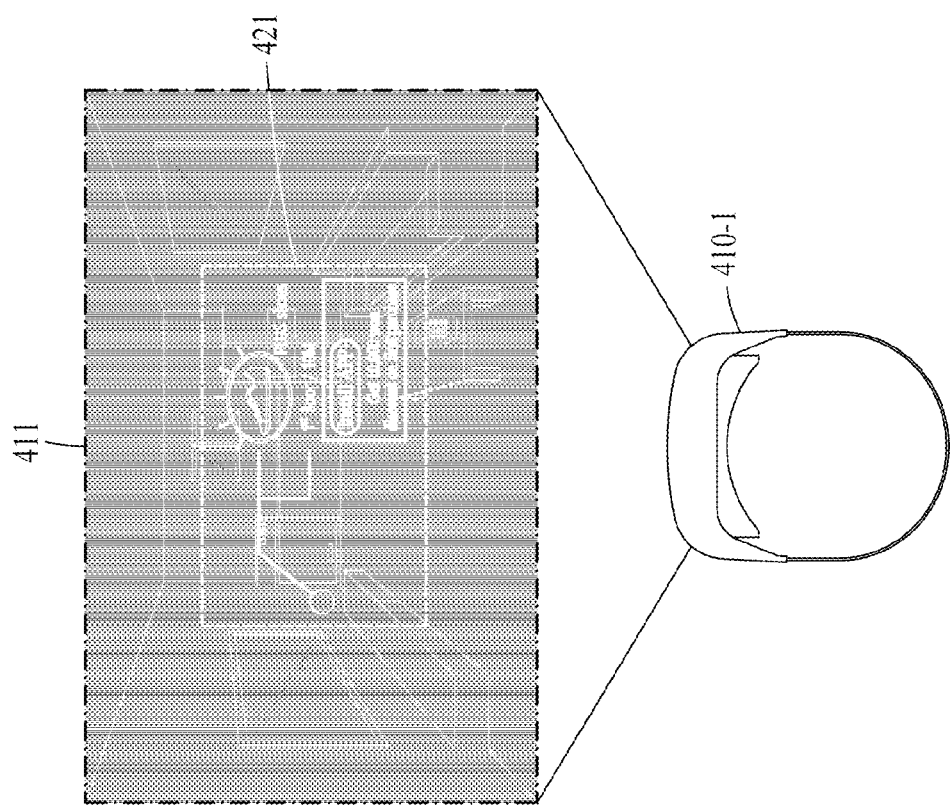

In an embodiment, the wearable AR device 200 may further include a third display 216a and a fourth display 216b. The third display 216a may be disposed at a bottom of the first transparent member 225a, and the fourth display 216b may be disposed at a bottom of the second transparent member 225b. For example, the third display 216a and the fourth display 216b may be OLED displays, but are not limited thereto. In FIG. 4 and the descriptions following FIG. 4, the first display 205, the second display 210, and the screen display portions 215a and 215b of the wearable AR device 200 will be described as a main display, and the third display 216a and the fourth display 216b of the wearable AR device 200 will be described as a sub-display.

In an embodiment, the wearable AR device 200 may further include a photo resistor 276. The photo resistor 276 may be disposed on a front upper end of the wearable AR device 200. The photo resistor 276 may measure ambient illuminance of the wearable AR device 200.

Figure 3:
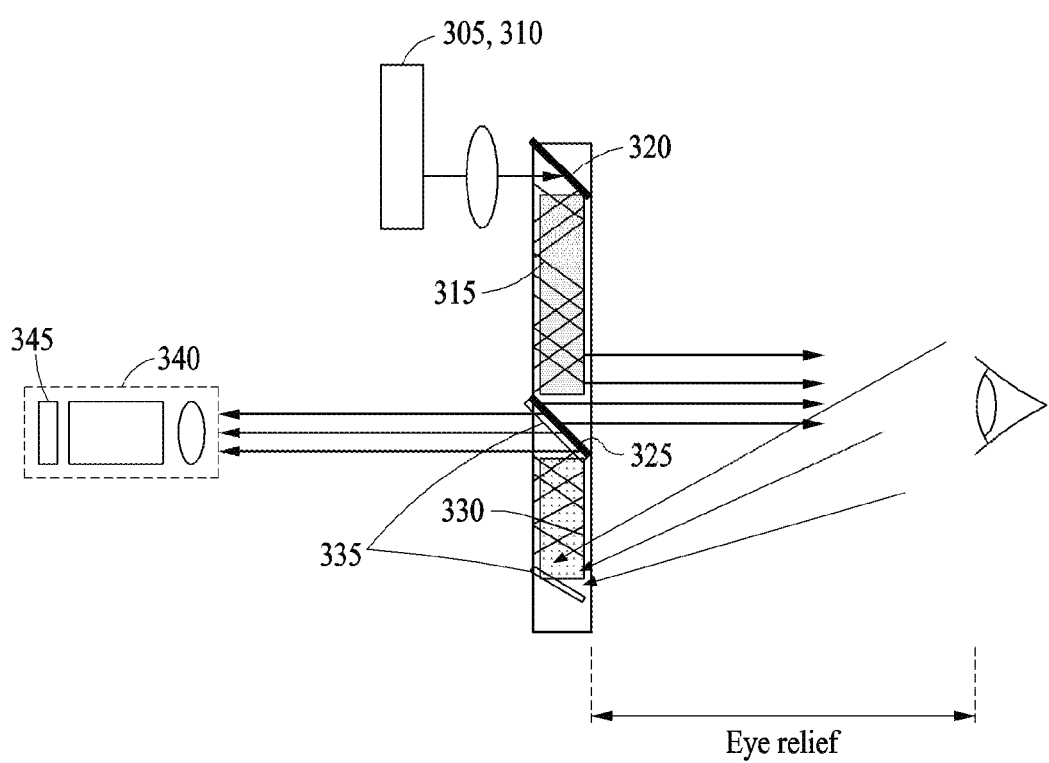
FIG. 3 is a diagram illustrating a camera and an eye-tracking sensor of a wearable AR device according to various embodiments.

FIG. 3 is a diagram illustrating a camera and an ET sensor of a wearable AR device according to various embodiments.

Referring to FIG. 3, a wearable AR device (e.g., the electronic device 101 of FIG. 1 or the wearable AR device 200 of FIG. 2) may include displays 305 and 310 (e.g., the displays 205 and 210 of FIG. 2), an optical waveguide (or a waveguide) 315, an input optical member 320 (e.g., the input optical members 220a and 220b of FIG. 2), an output optical member 325, an ET optical waveguide (or an ET waveguide) 330, an ET splitter 335, a camera 340 (e.g., the second cameras 270a and 270b), an ET sensor 345, and a lighting unit (e.g., the lighting units 230a and 230b of FIG. 2).

Referring to FIG. 3, light output from the displays 305 and 310 of the wearable AR device may be input to the input optical member 320, passed through the optical waveguide 315, and transmitted to a user's eye from the output optical member 325.

Referring to FIG. 3, the camera 340 may obtain an image of the user's eye. For example, the image of the user's eye may be input to the ET splitter 335 on the lower side and transmitted to the ET splitter 335 on the upper side via the ET optical waveguide 330. The camera 340 may obtain the image of the user's eye from the ET splitter 335 on the upper side.

The lighting unit may output IR light to a pupil region of the user. The IR light may be reflected from the user's pupil and transmitted to the ET splitter 335 together with the image of the user's eye. The image of the user's eye obtained by the camera 340 may include the reflected IR light. The ET sensor 345 may detect the IR light reflected from the user's pupil.

FIG. 4 is a diagram illustrating visibility of AR content displayed on a display according to ambient illuminance of an electronic device according to various embodiments.

Electronic devices 410-1 and 410-2 (e.g., the electronic device 101 of FIG. 1 or the wearable AR device 200 of FIG. 2) may include a transparent display 411. For example, the electronic devices 410-1 and 410-2 may be a see-through type head-mounted display (HMD). The HMD may be a display worn by a user in a form that is mounted on the head or in the form of glasses. Real objects outside the electronic devices 410-1 and 410-2 may pass through the transparent display 411 of the electronic devices 410-1 and 410-2 to be seen by a user of the electronic device. The electronic devices 410-1 and 410-2 may identify real objects displayed to the user through the transparent display 411. The electronic devices 410-1 and 410-2 may display AR content on the transparent display 411. For example, the electronic devices 410-1 and 410-2 may establish communication with an AR database in which information on real objects is stored, and may acquire information on each of the identified real objects from the AR database. The electronic devices 410-1 and 410-2 may generate AR content corresponding to the real object based on the information on the real object acquired from the AR database, and display the AR content on the transparent display 411.

A sensor module (e.g., the sensor module 176 of FIG. 1) of the electronic devices 410-1 and 410-2 may include a photo resistor (e.g., the photo resistor 276 of FIG. 2) that measures ambient illuminance of the electronic devices 410-1 and 410-2. The photo resistor may measure brightness around the electronic devices 410-1 and 410-2. The electronic devices 410-1 and 410-2 may adjust the brightness of the transparent display 411 itself based on the ambient illuminance of the electronic devices 410-1 and 410-2 measured by the photo resistor.

Visibility of the AR content displayed on the transparent display 411 may be different according to the ambient illuminance of an electronic device. When the ambient illuminance of the electronic device is low, the visibility of the AR content displayed on the transparent display 411 may be high. When the ambient illuminance of the electronic device is high, the visibility of the AR content displayed on the transparent display 411 may be low. When the brightness of the transparent display 411 is maintained at a predetermined (e.g., specified) illuminance, the visibility of the AR content may change according to a change in the ambient illuminance of the electronic device. For example, as shown in FIG. 4, when the ambient illuminance of the electronic device 410-1 falls below, for example, 500 lux or less, the visibility of AR contents 421 displayed on the transparent display 411 may increase. As another example, when the ambient illuminance of the electronic device 410-2 increases, for example, to 15,000 lux or more, the visibility of AR contents 422 displayed on the transparent display 411 may decrease.

Figure 5:
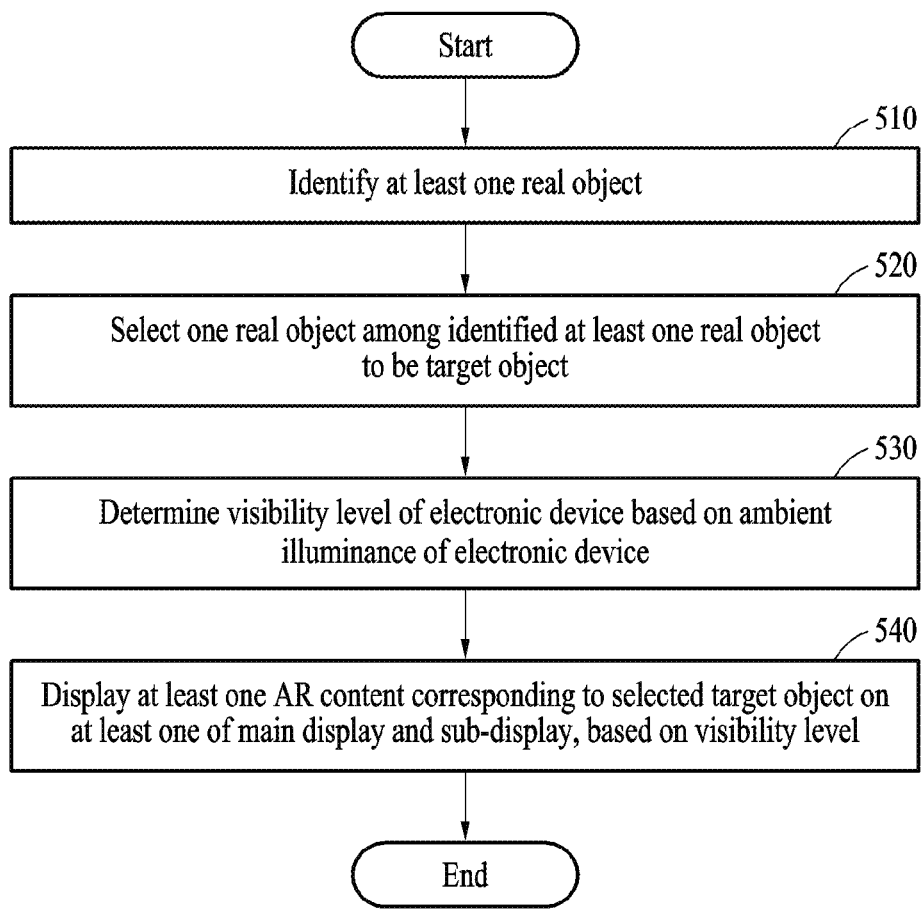
FIG. 5 is a flowchart illustrating an example method of displaying AR content corresponding to a target object according to various embodiments.

FIG. 5 is a flowchart illustrating an example method of displaying AR content corresponding to a target object according to various embodiments.

In operation 510, an electronic device (e.g., the electronic device 101 of FIG. 1 or the wearable AR device 200 of FIG. 2) may identify at least one real object displayed to a user through a main display. Here, passing through the main display may refer, for example, to passing through the screen display portions 215a and 215b of the main display illustrated in FIG. 2. A display module (e.g., the display module 160 of FIG. 1) of the electronic device may include a plurality of displays. The display module of the electronic device may include a main display (e.g., the main display of FIG. 2) and a sub-display (e.g., the sub-display of FIG. 2). Here, the main display may be a transparent display. The main display may be affected by ambient illuminance of the electronic device, but the sub-display may not be affected by the ambient illuminance of the electronic device.

At least one real object located outside the electronic device may be displayed to a user of the electronic device through the main display. The electronic device may identify at least one real object passing through the main display. The electronic device may identify at least one object area in which at least one real object is displayed on the main display.

In operation 520, the electronic device may select one real object among the identified at least one real object to be a target object. For example, the electronic device may select one real object among at least one real object to be the target object by considering a gaze direction of the user.

In operation 530, the electronic device may determine a visibility level of the electronic device based on ambient illuminance of the electronic device. A sensor module (e.g., the sensor module 176 of FIG. 1) of the electronic device may include a photo resistor. The electronic device may acquire ambient illuminance of the electronic device measured by the photo resistor. The visibility level of the electronic device may indicate a degree to which the user may identify the AR content displayed on the main display. As described above with reference to FIG. 4, the visibility level of the electronic device may decrease as the ambient illuminance of the electronic device increases, and the visibility level of the electronic device may increase as the ambient illuminance of the electronic device decreases.

In operation 540, the electronic device may display at least one AR content corresponding to the selected target object on at least one of the main display and the sub-display, based on the determined visibility level of the electronic device. The AR content corresponding to the target object may include first AR content corresponding to text related to the target object and second AR content corresponding to an image related to the target object. The AR content corresponding to the target object to be displayed on each of the main display and the sub-display by the electronic device may be different according to the visibility level of the electronic device. The electronic device may determine whether to display the AR content corresponding to the target object on the main display or the sub-display based on the visibility level of the electronic device. The electronic device may secure high visibility of the AR content corresponding to the target object by displaying the AR content corresponding to the target object on the determined display based on the visibility level of the electronic device.

Figure 6:
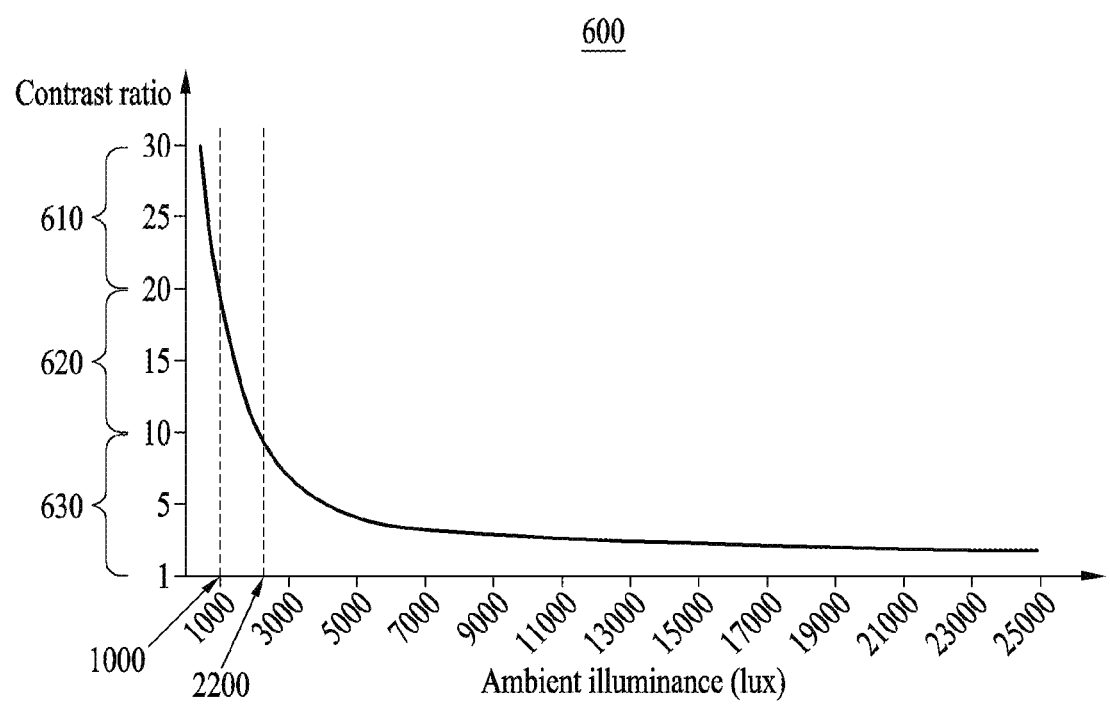
FIG. 6 is a graph illustrating a relationship between ambient illuminance of an electronic device and a contrast ratio of a display according to various embodiments.

FIG. 6 is a graph illustrating a relationship between ambient illuminance of an electronic device and a contrast ratio of a display according to various embodiments.

An electronic device may adjust the brightness of a transparent display. When the brightness of the display is kept constant, as ambient illuminance of the electronic device increases, a contrast ratio of the display may decrease. On the other hand, when the brightness of the display is kept constant, the contrast ratio of the display may increase as the ambient illuminance of the electronic device decreases. Here, the contrast ratio may be a ratio of a maximum luminance of the display to a minimum luminance of the display.

According to an embodiment, the electronic device may determine a visibility level of the electronic device based on the contrast ratio of the display. The higher the contrast ratio of the display is, the higher the visibility of AR content for a real object may be. On the other hand, the lower the contrast ratio of the display is, the lower the visibility of the AR content for the real object may be. The electronic device may classify the visibility level into a first level, a second level, and a third level based on the contrast ratio of the display.

The first level may be a visibility level at which visibility is high for both AR content corresponding to an image and AR content corresponding to text. The second level may be a visibility level at which visibility is low for the AR content corresponding to an image, but high for the AR content corresponding to text. The third level may be a visibility level at which visibility is low for both the AR content corresponding to an image and the AR content corresponding to text.

The electronic device may determine the visibility level of the electronic device based on ambient illuminance measured by a photo resistor. The electronic device may set an illuminance range corresponding to each visibility level according to a contrast ratio serving as a reference of the visibility level (e.g., the first level, the second level, and the third level). In other words, the electronic device may determine the visibility level of the electronic device according to the illuminance range to which the ambient illuminance of the electronic device belongs.

For example, graph 600 shown in FIG. 6 illustrates an example of a relationship between the ambient illuminance of the electronic device and the contrast ratio of the display when the electronic device keeps the brightness of the display constant at 800 nits. For example, when the contrast ratio of the display is greater than 20 the electronic device may determine the visibility level of the electronic device to be a first level 610, when the contrast ratio of the display is greater than 10 and less than or equal to 20 the electronic device may determine the visibility level of the electronic device to be a second level 620, and when the contrast ratio of the display does not exceed 10, the electronic device may determine the visibility level of the electronic device to be a third level 630. In this case, the electronic device may set the illuminance range corresponding to the first level to a range of 0 lux or more and less than 1,000 lux with reference to the graph 600. Similarly, the electronic device may set the illuminance range corresponding to the second level to a range of 1,000 lux or more and less than 2,200 lux. The electronic device may set the illuminance range corresponding to the third level to a range of 2,200 lux or more. For example, when the ambient illuminance of the electronic device is measured as 2000 lux when the brightness of the display is maintained at 800 nits, the electronic device may determine the visibility level of the electronic device to be the second level.

Figure 7:
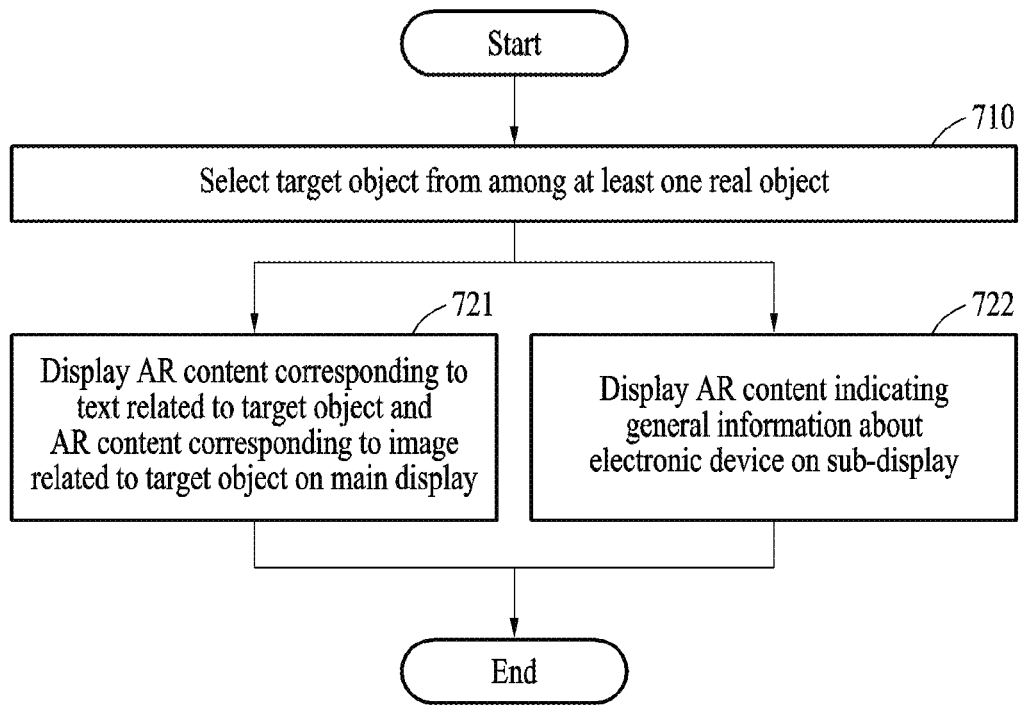
FIGS. 7, 8 and 9 include flowcharts and diagrams illustrating an example method of displaying AR content corresponding to a target object according to various embodiments.
Figure 8:
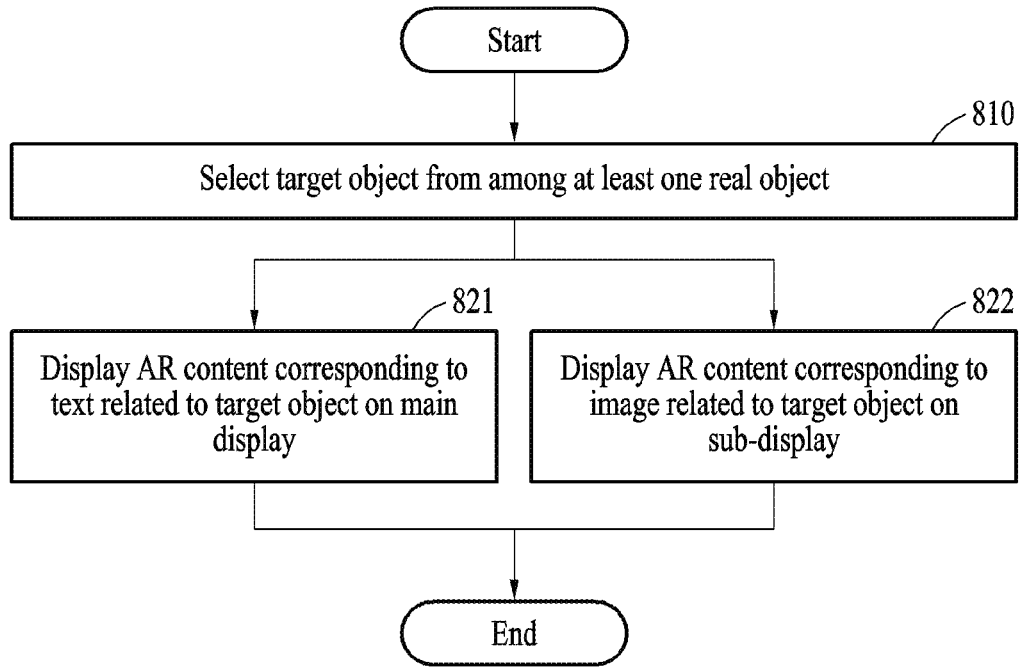
Figure 9:
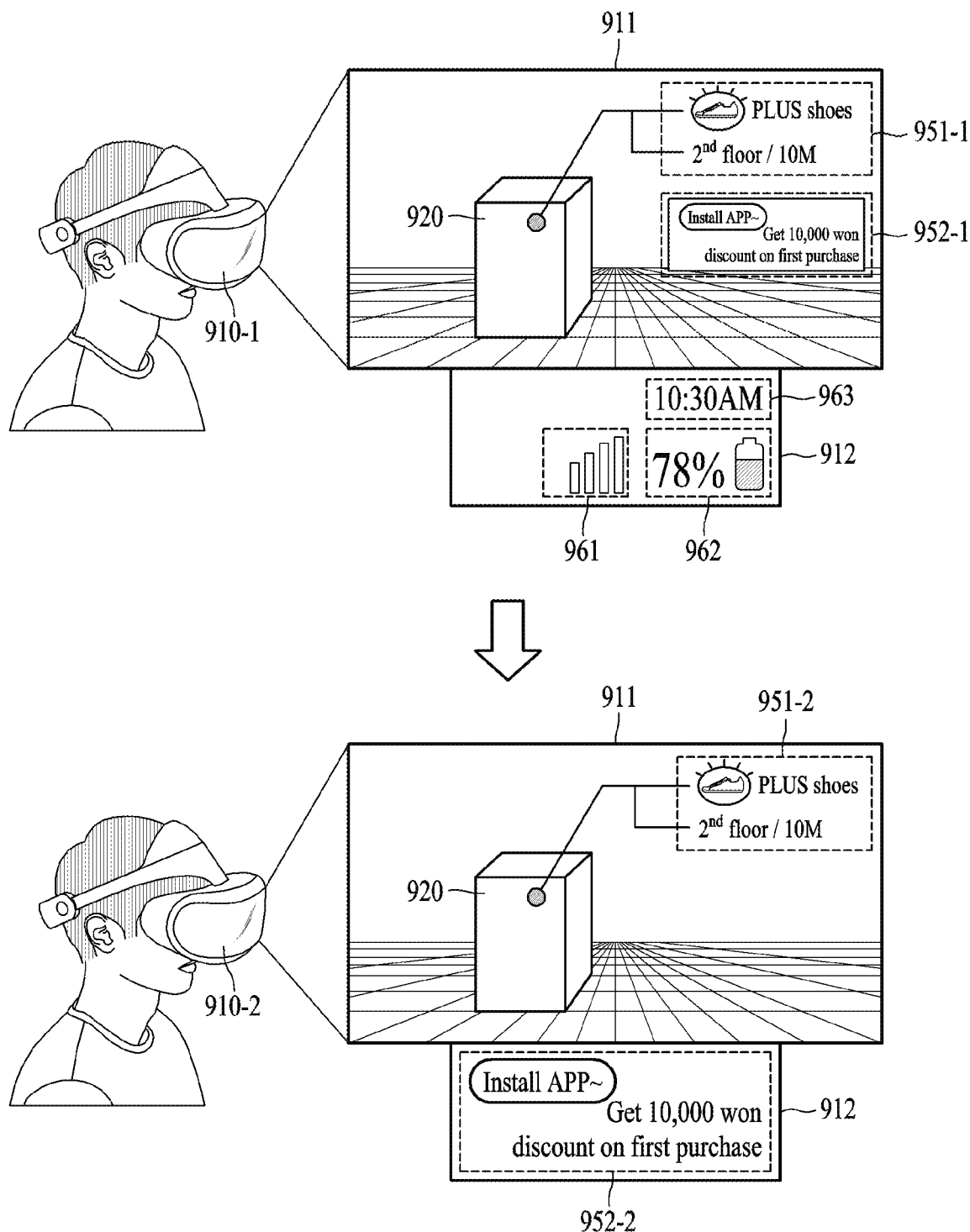

FIGS. 7, 8 and 9 include flowcharts and diagrams illustrating an example method of displaying AR content corresponding to a target object according to various embodiments.

FIG. 7 is a flowchart illustrating an example method of displaying AR content when a visibility level of an electronic device is the first level according to various embodiments. An electronic device (e.g., the electronic device 101 of FIG. 1 or the wearable AR device 200 of FIG. 2) may determine a visibility level of the electronic device to be the first level based on ambient illuminance of the electronic device. When the visibility level of the electronic device is the first level, a user of the electronic device may clearly identify both AR content corresponding to text and AR content corresponding to an image displayed on a main display of the electronic device.

In operation 710, the electronic device may select a target object from among at least one real object transmitted through the main display based, for example, on a gaze direction of the user. The selecting of the target object by the electronic device based on the gaze direction of the user will be described in greater detail below with reference to FIGS. 12 and 13.

In operation 721, the electronic device may display AR content corresponding to text related to the target object and AR content corresponding to an image related to the target object on the main display. When the visibility level of the electronic device is determined to be the first level, the electronic device may display first AR content corresponding to text related to the target object and second AR content corresponding to an image related to the target object on the main display. Here, the first AR content may be AR content corresponding to text, and the second AR content may be AR content corresponding to an image.

In an example illustrated in FIG. 9, an electronic device 910-1 may identify a building transmitted through a main display 911 as a real object 920, and track a gaze direction of the user to select the real object 920 as a target object. The electronic device 910-1 may display at least one AR content corresponding to the real object 920 on at least one of the main display 911 and a sub-display 912. When the electronic device 910-1 determines the visibility level of the electronic device to be the first level, the electronic device 910-1 may display first AR content 951-1 corresponding to text related to the real object 920 on the main display 911. The first AR content 951-1 may include, for example, text indicating a title or logo of a store located in a building corresponding to a real object, text (e.g., "2nd floor") indicating a location of a representative store located in the building, and text (e.g., "10 m") indicating a distance between the building and the electronic device. When the electronic device 910-1 determines the visibility level of the electronic device to be the first level, the electronic device 910-1 may display a second AR content 952-1 corresponding to an image related to the real object 920 on the main display 911. The second AR content 952-1 may include, for example, an image indicating detailed information (e.g., information about a discount, and the like) of a store located in a building corresponding to a real object.

Further, the electronic device 910-1 may indicate that AR content corresponding to the real object 920 is information related to the real object 920 on the main display 911. For example, the electronic device 910-1 may display the first AR content 951-1 and the second AR content 952-2 in the vicinity of an object area in which the real object 920 is displayed, and indicate that the first AR content 951-1 and the second AR content 952-2 are information related to the real object 920. As another example, the electronic device 910-1 may additionally display a virtual object linking the first AR content 951-1 and the object area in which the real object 920 is displayed on the main display 911, and indicate that the AR content 951-1 is information related to the real object 920.

Referring back to FIG. 7, in operation 722, the electronic device may display AR content indicating general information about the electronic device on the sub-display 912. The general information about the electronic device may include a system state of the electronic device, time information, and information for manipulation of the electronic device. The system state of the electronic device may include, for example, a remaining battery level of the electronic device, a mobile network signal connection state of the electronic device, Wi-Fi signal connection state of the electronic device, a Bluetooth communication execution state, and a sound/vibration state of the electronic device. For example, the electronic device may display AR content indicating a battery state of the electronic device, AR content indicating time information, and AR content indicating a menu for manipulation of the electronic device on the sub-display 912.

In the example illustrated in FIG. 9, when the electronic device 910-1 determines the visibility level of the electronic device to be the first level, AR content indicating general information about the electronic device may be displayed on the sub-display 912. As shown in FIG. 9, the electronic device 910-1 may display AR content 961 indicating a signal state of a mobile network, AR content 962 indicating a remaining battery level of the electronic device, and AR content 963 indicating time information on the sub-display 912.

FIG. 8 is a flowchart illustrating an example method of displaying AR content when a visibility level of an electronic device is the second level according to various embodiments. An electronic device (e.g., the electronic device 101 of FIG. 1 or the wearable AR device 200 of FIG. 2) may determine a visibility level of the electronic device to be the second level based on ambient illuminance of the electronic device. When the visibility level of the electronic device is the second level, a user of the electronic device may clearly identify AR content corresponding to text displayed on a main display of the electronic device, but may not clearly identify AR content corresponding to an image displayed on the main display of the electronic device.

In operation 810, the electronic device may select a target object from among at least one real object transmitted through the main display based on a gaze direction of the user. For example, operation 810 may be the same as or similar to operation 710 of FIG. 7.

In operation 821, the electronic device may display first AR content corresponding to text related to the target object on the main display. In operation 822, the electronic device may display second AR content corresponding to an image related to the target object on a sub-display.

In an example illustrated in FIG. 9, a visibility level of an electronic device 910-2 may be changed from the first level to the second level. The electronic device 910-2 may display first AR content 951-2 corresponding to text related to the real object 920 selected as the target object on the main display 911. The first AR content 951-1 and the first AR content 951-2 may be the same AR content, but are not limited thereto, and may be different AR content. For example, when information on the real object 920 is updated in an AR database before the visibility level of the electronic device 910-2 is changed from the first level to the second level, the first AR content corresponding to the text related to the real object 920 may also be changed. The electronic device 910-2 may display second AR content 952-2 corresponding to an image related to the real object 920 on the sub-display 912. Similarly, the second AR content 952-1 and the second AR content 952-2 may have different image sizes but otherwise be the same AR content, but are not limited thereto, and may be different AR content.

According to an embodiment, the electronic device may periodically acquire the ambient illuminance of the electronic device measured through a photo resistor. Accordingly, the electronic device may detect a change in the ambient illuminance of the electronic device. When the electronic device changes the visibility level of the electronic device based on the changed ambient illuminance, the electronic device may change the AR content corresponding to the target object displayed on at least one of the main display and the sub-display based on the changed visibility level.

In the example illustrated in FIG. 9, as described above, the visibility level of the electronic device may be changed from the first level to the second level. When the visibility level of the electronic device is changed from the first level to the second level, the electronic device may maintain the display of the first AR content corresponding to the text related to the target object and release the display of the second AR content corresponding to the image related to the target object on the main display 911. The electronic device may release the display of the AR content indicating general information about the electronic device on the sub-display 912, and may newly display the second AR content corresponding to the image related to the target object.

Figure 10:
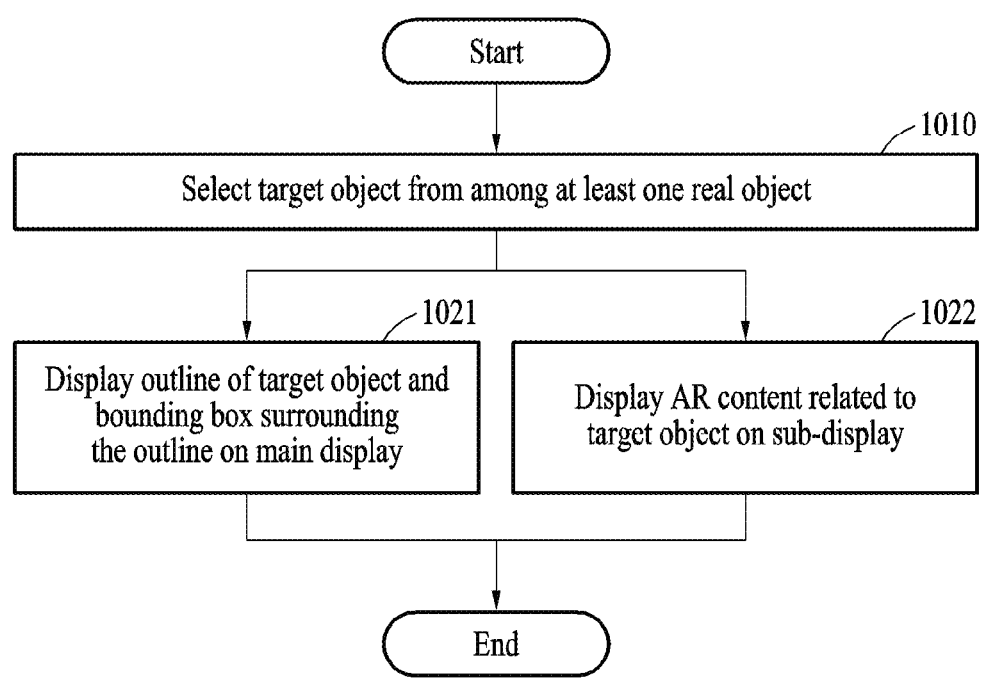
FIGS. 10 and 11 include a flowchart and diagrams illustrating an example method of displaying AR content corresponding to a target object according to various embodiments.
Figure 11:
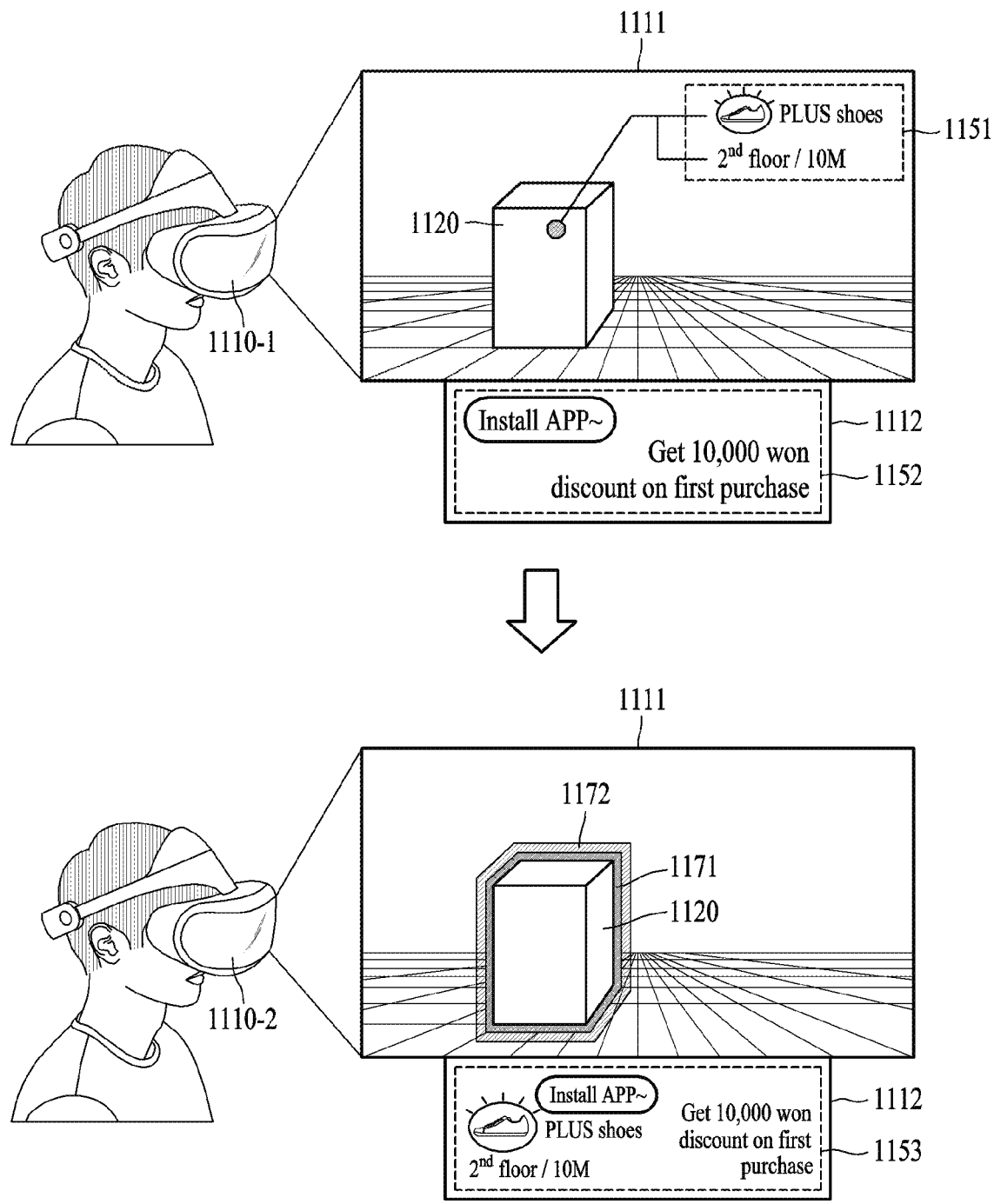

FIGS. 10 and 11 include a flowchart and a diagram illustrating an example method of displaying AR content corresponding to a target object according to various embodiments.

FIG. 10 is a flowchart illustrating an example method of displaying AR content when a visibility level of an electronic device is the third level according to various embodiments. An electronic device (e.g., the electronic device 101 of FIG. 1 or the wearable AR device 200 of FIG. 2) may determine a visibility level of the electronic device to be the third level based on ambient illuminance of the electronic device. When the visibility level of the electronic device is the third level, a user of the electronic device may not clearly identify both AR content corresponding to text and AR content corresponding to an image displayed on a main display of the electronic device.

In operation 1010, the electronic device may select a target object from among at least one real object transmitted through the main display based on a gaze direction of the user. For example, operation 1010 may be the same as or similar to operation 710 of FIG. 7.

In operation 1021, the electronic device may display an outline of an object area in which the target object is displayed and a bounding box surrounding the outline, in addition to AR content corresponding to the target object, on the main display. In operation 1022, the electronic device may display all AR content corresponding to the target object on a sub-display.

In an example illustrated in FIG. 11, when an electronic device 1110-1 determines a visibility level of the electronic device to be the second level, the electronic device 1110-1 may display first AR content 1151 corresponding to text related to a real object 1120 selected as a target object on a main display 1111, and display second AR content 1152 corresponding to an image related to the real object 1120 on a sub-display 1112. In addition, a visibility level of an electronic device 1110-2 may be changed from the second level to the third level. When the electronic device 1110-2 determines the visibility level of the electronic device to be the third level, the electronic device 1110-2 may display an outline 1171 of an object area in which the real object 1120 selected as the target object is displayed and a bounding box 1172 surrounding the outline 1171 on the main display 1111, in addition to the AR content corresponding to the target object. For example, the electronic device 1110-2 may display the outline 1171 and the bounding box 1172 in a two-dimensional form, and each of the outline 1171 and the bounding box 1172 may have an area. The electronic device 1110-2 may display the outline 1171 in a same or similar shape as a shape of the object area in which the real object 1120 is displayed. For example, the electronic device 1110-2 may display the outline 1171 to be parallel to each edge of the object area in which the real object 1120 is displayed. For example, the electronic device 1110-2 may display points separated by a predetermined first distance or less from each point corresponding to the edge of the object area in which the real object 1120 is displayed as the outline 1171. However, the shape of the outline 1171 is not necessarily limited to the above-described example, and the outline 1171 may have a shape (e.g., a circular shape or a rectangular shape) independent of the shape of the object area in which the real object 1120 is displayed. Similarly, the electronic device 1110-2 may display the bounding box 1172 in a same or similar shape as a shape of the object area in which the real object 1120 is displayed. For example, the electronic device 1110-2 may display the bounding box 1172 to be parallel to each edge of each object area in which the real object 1120 is displayed. For example, the electronic device 1110-2 may display points separated by a predetermined second distance or less from each point corresponding to the edge of the outline 1171 as the bounding box 1172. However, the shape of the bounding box 1172 is not necessarily limited to the above-described example, and the bounding box 1172 may have a shape (e.g., a circular shape or a rectangular shape) independent of the shape of the object area in which the real object 1120 is displayed.

The electronic device 1110-2 may increase visibility of the real object 1120 shown through the main display 1111 by displaying the outline 1171 and the bounding box 1172 of the object area in which the real object 1120 is displayed on the main display 1111. For example, the electronic device 1110-2 may display the outline 1171 and the bounding box 1172 respectively with the same color and different brightnesses, but is not limited thereto.

According to an embodiment, when a visibility level of the electronic device is determined to be the third level, the electronic device may display AR content generated based on text related to the target object and an image related to the target object on the sub-display.

In the example illustrated in FIG. 11, the visibility level of the electronic device 1110-2 may be changed from the second level to the third level. When the electronic device 1110-2 determines the visibility level of the electronic device to be the third level, the electronic device 1110-2 may display AR content 1153 generated based on text and an image related to the real object 1120 selected as the target object on the sub-display 1112. For example, as shown in FIG. 11, the electronic device 1110-2 may display a new image generated by inserting text related to the real object 1120 into an image related to the real object 1120 as the AR content 1153 on the sub-display 1112. As another example, the electronic device 1110-2 may display AR content (not shown) in which an image related to the real object 1120 and text related to the real object 1120 are simply listed on the sub-display 1112.

In the example illustrated in FIG. 11, the visibility level of the electronic device may be changed from the second level to the third level. When the visibility level of the electronic device is changed from the second level to the third level, the electronic device may release the display of the first AR content corresponding to the text related to the target object on the main display 1111, and display an outline of an object area in which the target object is displayed and a bounding box surrounding the outline. When the visibility level of the electronic device is changed from the second level to the third level, the electronic device may update the AR content corresponding to the target object displayed on the sub-display 1112.

Figure 12:
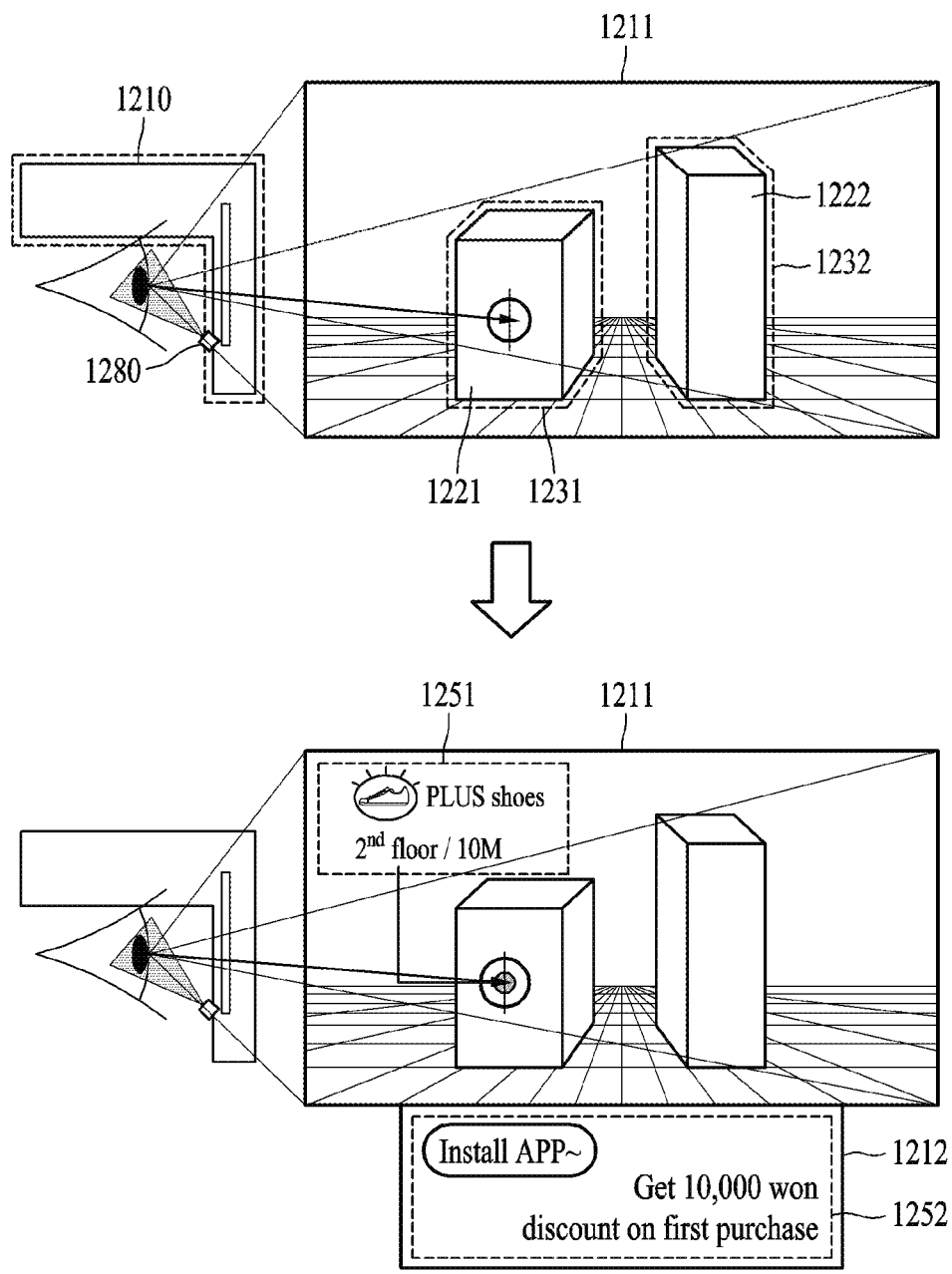
FIG. 12 is a diagram illustrating an example process of selecting a target object from among at least one real object according to various embodiments.

FIG. 12 is a diagram illustrating an example process of selecting a target object from among at least one real object according to various embodiments.

A camera module (e.g., the camera module 180 of FIG. 1) of an electronic device 1210 (e.g., the electronic device 101 of FIG. 1) may further include an ET camera 1280 (e.g., the second cameras 270a and 270b of FIG. 2) for tracking a gaze direction of a user. The ET camera 1280 may detect and track the user's pupil or iris. The ET camera 1280 may detect the gaze direction of the user based on a tracking result.

The electronic device 1210 may identify at least one real object displayed to the user through a main display. The electronic device 1210 may select one real object among the identified at least one real object as a target object based on the gaze direction of the user tracked by the ET camera 1280. The electronic device 1210 may select a real object indicated by the gaze direction of the user from among at least one real object as the target object.

In an example illustrated in FIG. 12, the electronic device 1210 may identify real objects 1221 and 1222 displayed through a main display 1211, and identify object areas 1231 and 1232 in which each of the real objects 1221 and 1222 are displayed on the main display 1211. For example, the real object 1221 may be shown in the object region 1231 in the main display 1211, and the real object 1222 may be shown in the object region 1232 in the main display 1211. The electronic device 1210 may identify a gaze area 1240 corresponding to the gaze direction of the user on the main display 1211. For example, a size of the gaze area may be preset.

For example, in the example of FIG. 12, the real object 1221 corresponding to the object area 1231 closest to the gaze area 1240 corresponding to the gaze direction of the user among the object regions 1231 and 1232 in which the real objects 1221 and 1222 are respectively displayed on the main display 1211, may be defined as a real object indicated by the gaze direction of the user. As another example, the real object 1221 corresponding to the object area 1231 overlapping with the gaze area 1240 corresponding to the gaze direction of the user among the object areas 1231 and 1232 in the main display 1211 may be defined as a real object indicated by the gaze direction of the user. For example, the electronic device 1210 may select the real object 1221 indicated by the gaze direction of the user as the target object.

According to an embodiment, the electronic device 1210 may select one real object as the target object in response to one real object indicated by the gaze direction of the user being maintained for a predetermined time on the main display.

The electronic device 1210 may select the real object 1221 as the target object in response to the real object 1221 indicated by the gaze direction of the user being continuously maintained for a predetermined time. The predetermined time may be 3 seconds, but is not limited thereto. For example, it is assumed that the electronic device 1210 selects the real object 1221 as the target object based on the gaze direction of the user. The electronic device 1210 may select the real object 1221 as the target object in response to the real object 1221 indicated by the gaze direction of the user being continuously maintained for a predetermined time. In addition, even if the real object 1221 indicated by the gaze direction of the user is changed to the real object 1222, when the gaze direction of the user does not continuously indicate the real object 1222 for a predetermined time, the electronic device 1210 may still maintain the real object 1221 as the target object.

When the real object 1221 is selected as the target object, the electronic device 1210 may display at least one AR content corresponding to the real object 1221 on at least one of the main display 1211 and a sub-display 1212. For example, when the electronic device 1210 determines a visibility level of the electronic device to be the second level, the electronic device 1210 may display first AR content 1251 corresponding to text related to the real object 1221 on the main display 1211, and display second AR content 1252 corresponding to an image related to the real object 1221 on the sub-display 1212.

Figure 13:
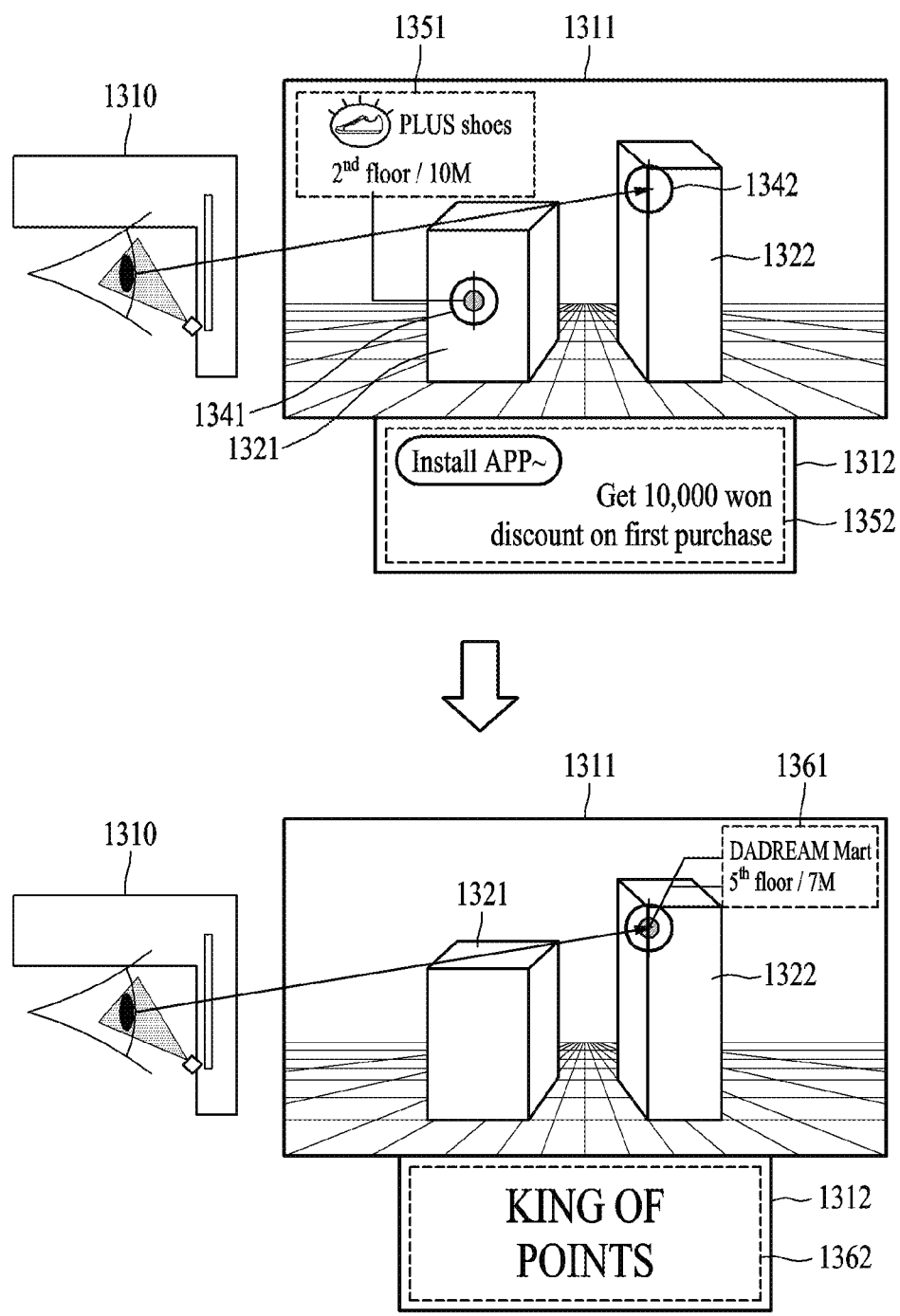
FIG. 13 is a diagram illustrating an example change of the target object according to a change in a gaze direction of a user, according to various embodiments.

FIG. 13 is a diagram illustrating an example change of target object according to a change in a gaze direction of a user, according to various embodiments.

An electronic device 1310 (e.g., the electronic device 101 of FIG. 1 or the wearable AR device 200 of FIG. 2) may change a target object based on a gaze direction of a user. The electronic device 1310 may detect a change in the gaze direction of the user. When a real object indicated by the gaze direction of the user is changed from a first real object to a second real object, the electronic device 1310 may change the target object from the first real object to the second real object. In this case, the electronic device 1310 may release the display of AR content corresponding to a first real object displayed on at least one of a main display and a sub-display, and display AR content corresponding to a second real object on at least one of the main display and the sub-display.

In an example illustrated in FIG. 13, the electronic device 1310 may select a real object 1321 as a target object based on a gaze direction of a user. The electronic device 1310 may display AR contents 1351 and 1352 corresponding to the real object 1321 on a main display 1311 and a sub-display 1312, respectively.

In addition, the electronic device 1310 may detect a change in the gaze direction of the user. For example, the electronic device 1310 may detect that a gaze area corresponding to the gaze direction of the user is changed from a gaze area 1341 to a gaze area 1342 on the main display 1311 according to the change in the gaze direction of the user. That is, the real object indicated by the gaze direction of the user may be changed from the real object 1321 to a real object 1322. The electronic device 1310 may change the target object to the real object 1322 in response to the real object 1322 indicated by the gaze direction of the user being maintained for a predetermined time (e.g., 3 seconds). In response to the target object being changed from the real object 1321 to the real object 1322, the electronic device 1310 may release the display of AR content 1351 corresponding to text related to the real object 1321 and display AR content 1361 corresponding to text related to the real object 1322 on the main display 1311. In addition, in response to the target object being changed from the real object 1321 to the real object 1322, the electronic device 1310 may release the display of AR content 1352 corresponding to an image related to the real object 1321 and display AR content 1362 corresponding to an image related to the real object 1322 on the sub-display 1312. In other words, the electronic device 1310 may not change the AR content displayed on the main display 1311 and the sub-display 1312 at a time when the user's gaze direction is changed. The electronic device 1310 may display the AR content corresponding to the real object 1321 on the main display 1311 and the sub-display 1312 until the target object is changed, and from the time when the target object is changed, the AR content corresponding to the real object 1322 may be displayed on the main display 1311 and the sub-display 1312.

Figure 14:
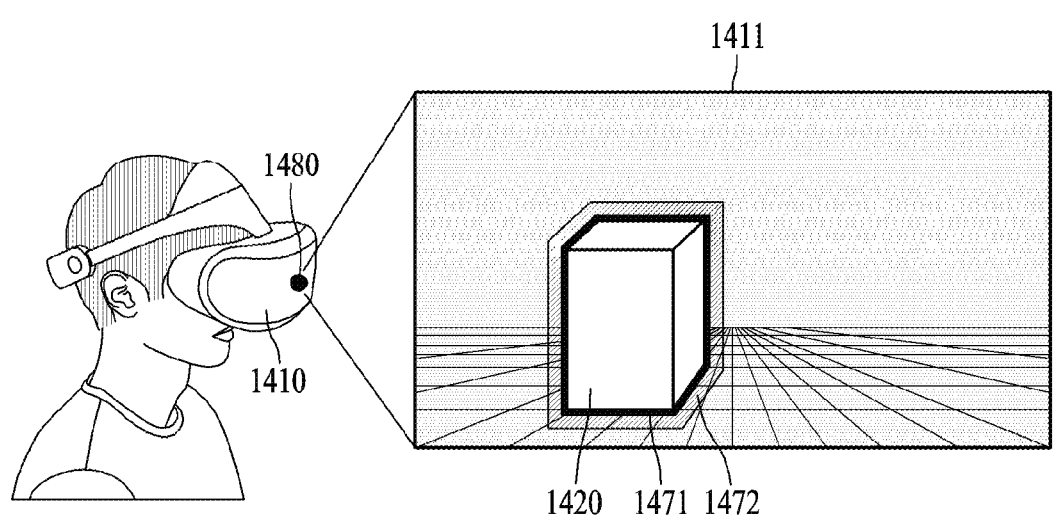
FIG. 14 is a diagram illustrating an example process of determining colors of an outline and a bounding box surrounding the outline of an area in which a target object is displayed, according to various embodiments.

FIG. 14 is a diagram illustrating an example process of determining colors of an outline and a bounding box surrounding the outline of an object area in which a target object is displayed, according to various embodiments.

According to an embodiment, an electronic device 1410 (e.g., the electronic device 101 of FIG. 1 or the wearable AR device 200 of FIG. 2) may further include a photo-view (PV) camera 1480 for detecting an ambient color of the electronic device. For example, the PV camera 1480 may be disposed to face the front of the electronic device 1410. The electronic device may determine a color of an outline of an object area in which a target object is displayed and a bounding box surrounding the outline, based on an ambient color of the electronic device detected through the PV camera 1480. In other words, the electronic device may display the outline of the object area in which the target object is displayed and the bounding box surrounding the outline in a different color based on the ambient color of the electronic device detected through the PV camera 1480.

In an example illustrated in FIG. 14, the electronic device 1410 may select a real object 1420 displayed through a main display 1411 as a target object. The electronic device 1410 may compare a color of an outline 1471 of an object area in which a real object 1420 is displayed and a bounding box 1472 surrounding the outline in an ambient color of the electronic device to determine a color with high visibility. For example, a color with high visibility compared to an ambient color may be a color complementary to the ambient color, but is not limited thereto, and may also be a color having a difference of more than a threshold color value when compared with a color value of the ambient color. For example, as illustrated in FIG. 14, when the electronic device 1410 determines that the ambient color of the electronic device is yellow through the PV camera 1480, the outline 1471 and the bounding box 1472 may be displayed in indigo, which is complementary to yellow. As another example, when the electronic device 1410 determines that the ambient color of the electronic device is blue, the outline 1471 and the bounding box 1472 may be displayed in orange, which is complementary to blue. The electronic device 1410 may display each of the outline 1471 and the bounding box 1472 in the same color, but with different brightnesses. The electronic device 1410 may detect a change in the ambient color of the electronic device, and based on the changed ambient color, change the color of the outline 1471 of the area in which the real object 1420 is displayed and the bounding box 1472 surrounding the outline 1471.

According to an embodiment, the electronic device 1410 may display an outline of an area in which a target object is displayed and a bounding box surrounding the outline in a representative color corresponding to the target object. The representative color corresponding to the target object may be a color set by mapping to the target object by a subject having control over the target object. Here, the subject having control over the target object may be a subject who registered the target object in an AR database in which information about the real objects is stored.

Figure 15:
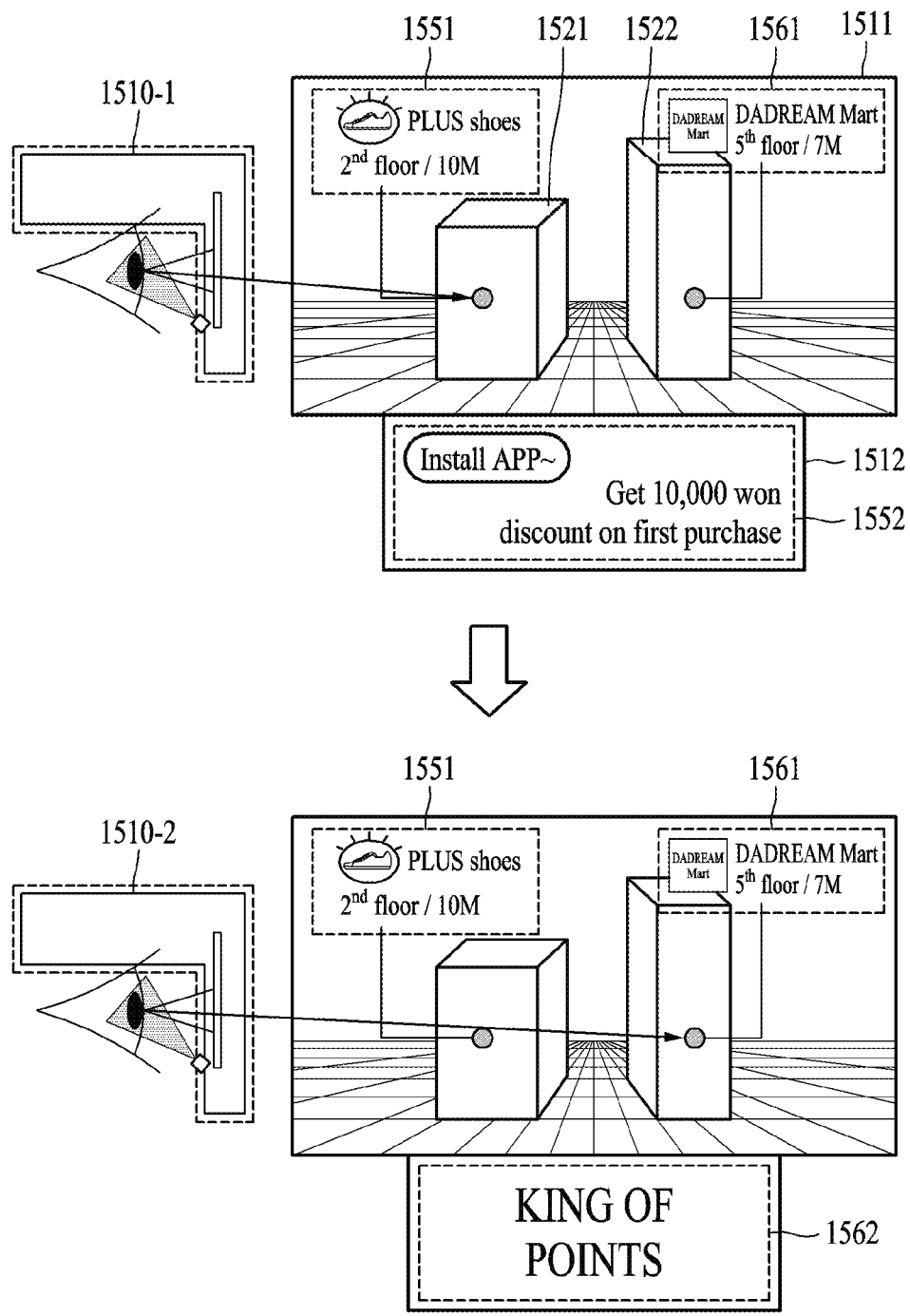
FIGS. 15 and 16 are diagrams illustrating an example method of displaying AR content when an electronic device identifies a plurality of real objects, according to various embodiments.
Figure 16:
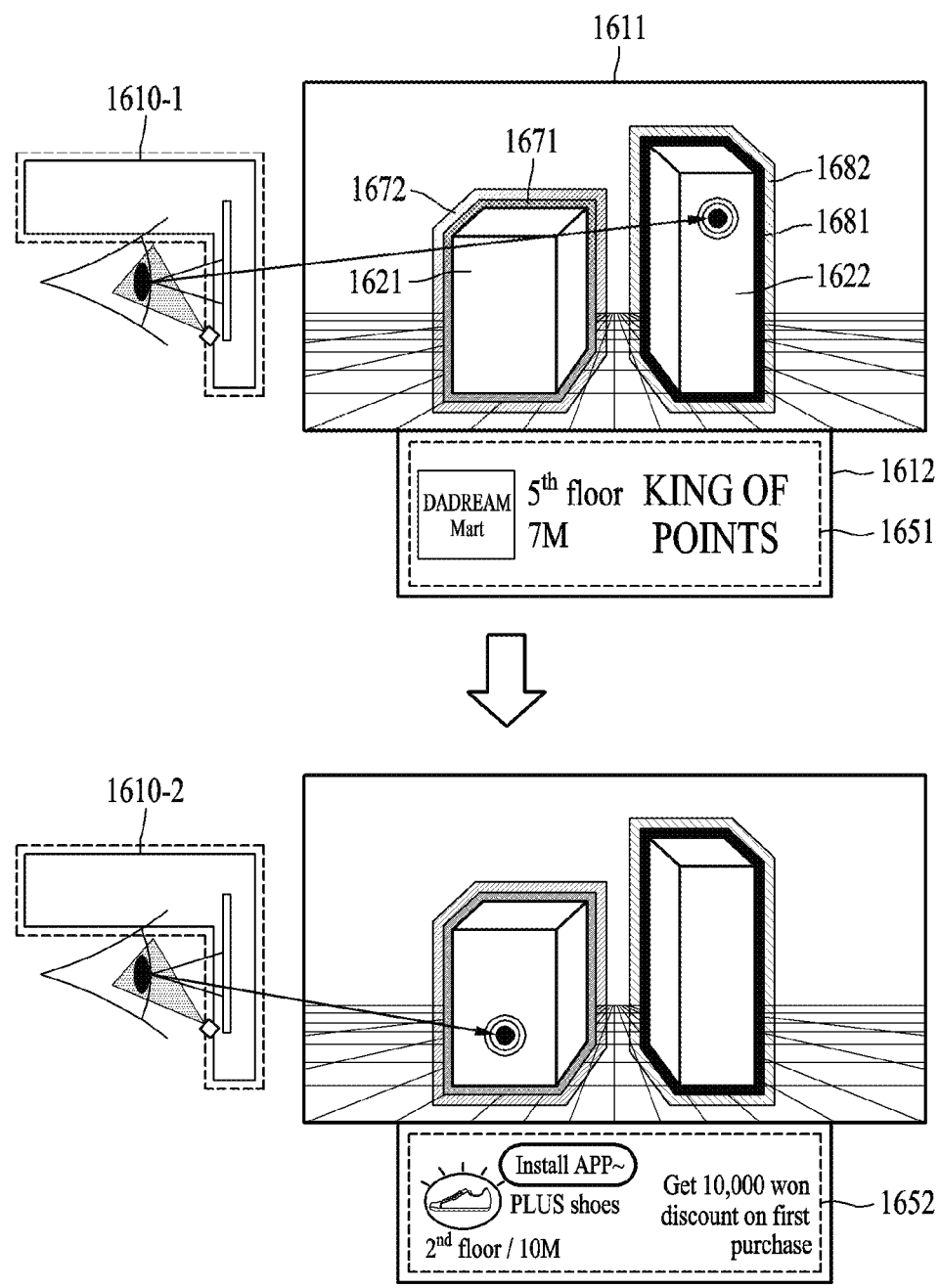

FIGS. 15 and 16 are diagrams illustrating an example method of displaying AR content when an electronic device identifies a plurality of real objects, according to various embodiments.

An electronic device (e.g., the electronic device 101 of FIG. 1 or the wearable AR device 200 of FIG. 2) may identify a plurality of real objects that are displayed through a main display. According to an embodiment, when the electronic device identifies a plurality of real objects, the electronic device may display AR content corresponding to each of the plurality of real objects on the main display, and display only AR content corresponding to a target object on a sub-display.

In an example illustrated in FIG. 15, an electronic device 1510-1 may identify a plurality of real objects 1521 and 1522 displayed through a main display 1511. The electronic device 1510-1 may determine a visibility level of the electronic device as the second level, and select the real object 1521 indicated by a gaze direction of a user as the target object. The electronic device 1510-1 may display both AR content 1551 corresponding to text related to the real object 1521 and AR content 1561 corresponding to text related to the real object 1522 on the main display 1511. The electronic device 1510-1 may display only AR content 1552 corresponding to an image related to the real object 1521 selected as the target object on a sub-display 1512.

An electronic device 1510-2 may change the target object to the real object 1522 based on a change in a gaze direction of the user. For example, the electronic device 1510-2 may change the target object to the real object 1522 in response to the real object 1522 indicated by the changed gaze direction of the user being maintained for a predetermined time. In this case, the electronic device 1510-2 may maintain the display of the AR content 1551 corresponding to the real object 1521 and the AR content 1561 corresponding to the real object 1522 on the main display 1511. On the other hand, the electronic device 1510-2 may release the display of the AR content 1552 corresponding to the image related to the real object 1521 and newly display AR content 1562 corresponding to the image related to the real object 1522 which is the changed target object on the sub-display 1511.

In an example illustrated in FIG. 16, an electronic device 1610-1 may identify a plurality of real objects 1621 and 1622 displayed through a main display 1611. The electronic device 1610-1 may determine a visibility level of the electronic device as the third level, and select the real object 1622 indicated by a gaze direction of a user as a target object. The electronic device 1610-1 may display an outline 1671 of an object area in which the real object 1621 is displayed and a bounding box 1672 surrounding the outline 1671, and an outline 1681 of an object area in which the real object 1622 is displayed and a bounding box 1682 surrounding the outline 1681 on the main display 1611. For example, the electronic device 1610-1 may display the outline 1671 and the bounding box 1672 corresponding to the real object 1621 as a first color with high visibility compared to an ambient color of the electronic device, and display the outline 1681 and the bounding box 1682 corresponding to the real object 1622 as a second color with high visibility compared to an ambient color of the electronic device. Here, the first color and the second color may be the same color or different colors. As another example, the electronic device 1610-1 may display the outline 1671 and the bounding box 1672 corresponding to the real object 1621 in a representative color corresponding to the real object 1621, and display the outline 1681 and the bounding box 1682 corresponding to the real object 1622 in a representative color corresponding to the real object 1622.

In addition, an electronic device 1610-2 may change the target object to the real object 1621 based on a change in a gaze direction of the user. For example, the electronic device 1610-2 may change the target object to the real object 1621 in response to the real object 1622 indicated by the changed gaze direction of the user being maintained for a predetermined time. In this case, the electronic device 1610-2 may maintain the display of the outline 1671 and the bounding box 1672 corresponding to the real object 1621, and the display of the outline 1681 and the bounding box 1682 corresponding to the real object 1622 on the main display 1611. On the other hand, the electronic device 1610-2 may release the display of the AR content 1651 corresponding to the real object 1622 and newly display the AR content 1652 corresponding to the real object 1621 on the sub-display 1612.

Figure 17:
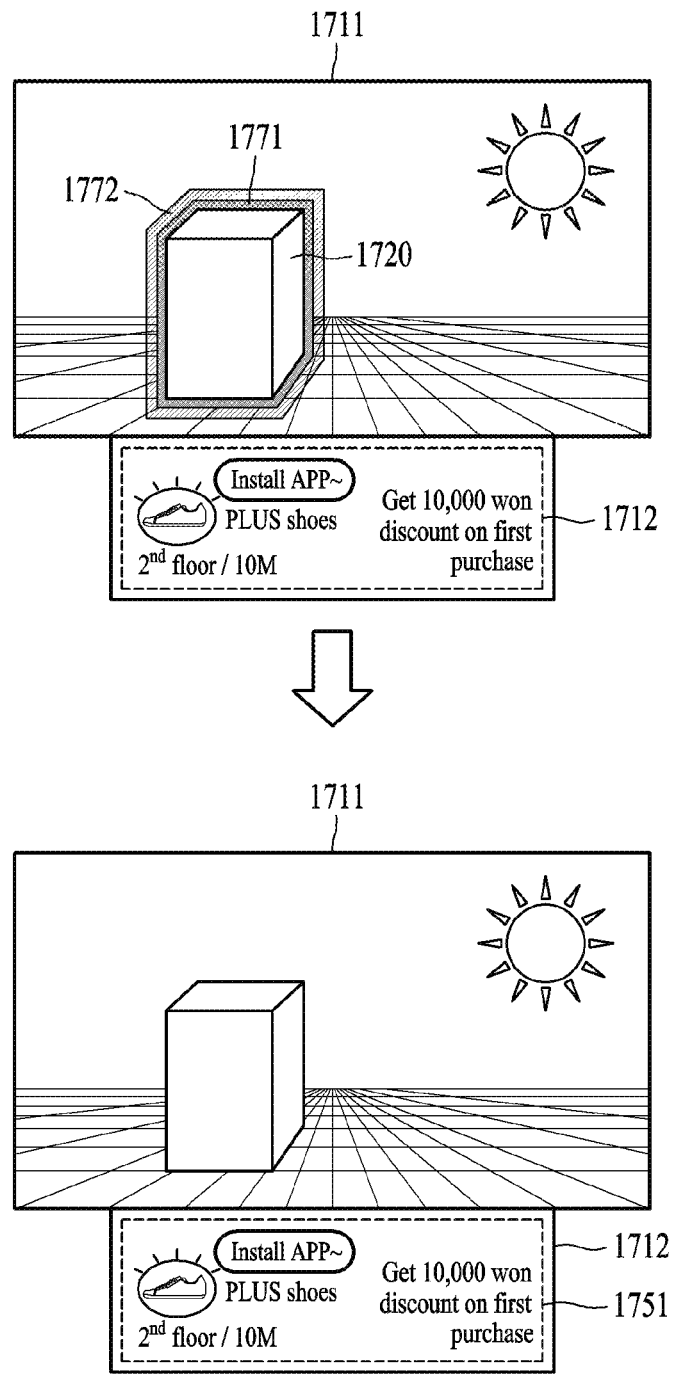
FIG. 17 is a diagram illustrating an example process in which an electronic device determines whether to display AR content on a main display based on a user input, according to various embodiments.

FIG. 17 is a diagram illustrating an example process in which an electronic device determines whether to display AR content on a main display based on a user input, according to various embodiments.

An electronic device (e.g., the electronic device 101 of FIG. 1 or the wearable AR device 200 of FIG. 2) may control the display of AR content on a main display based on a user input. The electronic device may determine, based on the user input, whether to display an outline of an object area in which a target object is displayed and a bounding box surrounding the outline on the main display. The electronic device may save battery power of the electronic device by releasing the display of the AR content on the main display.

In an example illustrated in FIG. 17, the electronic device may identify a real object 1720 displayed through a main display 1711. The electronic device may determine a visibility level of the electronic device as the third level, and may select the real object 1720 as a target object based on a gaze direction of a user. Here, the user of the electronic device may determine that visibility, in the main display 1711, of an outline 1771 of an object area in which the real object 1720 is displayed and a bounding box 1772 surrounding the outline 1771 itself is low due to high ambient illuminance. In this case, since visibility of the outline 1771 and the bounding box 1772 is low, visibility of the real object 1720 may not be increased. The user may release display of the outline 1771 and the bounding box 1772 by controlling the electronic device. The electronic device may release the display of the outline 1771 and the bounding box 1772 on the main display 1711 based on the user input, and maintain display of AR content 1751 corresponding to the real object 1720 selected as the target object on a sub-display 1712.

According to an example embodiment, an electronic device may include: a sensor module including a photo resistor configured to measure ambient illuminance of the electronic device, a display module including a main display and a sub-display, a memory including computer-executable instructions, and a processor configured to execute the instructions by accessing the memory, wherein the processor may be configured to: identify at least one real object displayed through the main display, select one real object from among the identified at least one real object to be a target object, determine a visibility level of the electronic device based on the ambient illuminance of the electronic device, and display at least one augmented reality (AR) content corresponding to the selected target object on at least one of the main display and the sub-display based on the determined visibility level.

According to an example embodiment, based on the visibility level of the electronic device being determined to be a first level, the processor may be configured to display AR content corresponding to text related to the target object and AR content corresponding to an image related to the target object on the main display.

According to an example embodiment, based on the visibility level of the electronic device being determined to be a second level, the processor may be configured to display AR content corresponding to text related to the target object on the main display and display AR content corresponding to an image related to the target object on the sub-display.

According to an example embodiment, based on the visibility level of the electronic device being determined to be a third level, the processor may be configured to: display, on the sub-display, all AR content corresponding to the target object, and display, on the main display, an outline of an area in which the target object is displayed and a bounding box surrounding the outline in addition to the AR content corresponding to the target object.

According to an example embodiment, based on the visibility level of the electronic device being determined to be a third level, the processor may be configured to display, on the sub-display, AR content generated based on text related to the target object and an image related to the target object.

According to an example embodiment, based on the processor detecting a change in the ambient illuminance of the electronic device and changing the visibility level of the electronic device based on the changed ambient illuminance, the processor may be configured to change the AR content corresponding to the target object displayed on at least one of the main display and the sub-display based on the changed visibility level.

According to an example embodiment, the electronic device may further include a first camera configured to track a gaze direction of a user wearing the electronic device, and the processor may be configured to select one real object indicated by the gaze direction tracked through the first camera from among the identified at least one real object as the target object.

According to an example embodiment, based on the one real object indicated by the gaze direction of the user being maintained for a specified time, the processor may be configured to select the one real object as the target object.

According to an example embodiment, the electronic device may further include a second camera configured to track an ambient color of the electronic device, and the processor may be configured to: display an outline of an area in which the target object is displayed and a bounding box surrounding the outline in a color different from the ambient color of the electronic device based on the ambient color of the electronic device detected through the second camera.

According to an example embodiment, based on a plurality of real objects being identified, the processor may be configured to: display AR content corresponding to each of the plurality of real objects on the main display, and display AR content corresponding to the target object on the sub-display, and based on the target object being changed, the processor may be configured to change the AR content displayed on the sub-display while maintaining the AR content displayed on the main display.

According to an example embodiment, the processor may be configured to determine whether to display an outline of an area in which the target object is displayed and a bounding box surrounding the outline on the main display, respectively, based on an input.

According to an embodiment, a method implemented by a processor may include: identifying at least one real object displayed through a main display, selecting one real object from among the identified at least one real object as a target object, determining a visibility level of an electronic device based on ambient illuminance of the electronic device, and displaying at least one augmented reality (AR) content corresponding to the selected target object on at least one of the main display and a sub-display based on the determined visibility level.

The displaying of the at least one AR content corresponding to the target object according to an example embodiment may include displaying AR content corresponding to text related to the target object and AR content corresponding to an image related to the target object on the main display, based on determining that the visibility level of the electronic device is a first level.

The displaying of the at least one AR content corresponding to the target object according to an example embodiment may include displaying AR content corresponding to text related to the target object on the main display and displaying AR content corresponding to an image related to the target object on the sub-display, based on determining that the visibility level of the electronic device is a second level.

The displaying of the at least one AR content corresponding to the target object according to an example embodiment may include displaying, on the sub-display, all AR content corresponding to the target object, and displaying, on the main display, an outline of an area in which the target object is displayed and a bounding box surrounding the outline in addition to the AR content corresponding to the target object, based on determining that the visibility level of the electronic device is a third level.

The displaying of the at least one AR content corresponding to the target object according to an example embodiment may include displaying, on the sub-display, AR content generated based on text related to the target object and an image related to the target object, based on determining that the visibility level of the electronic device is a third level.

The method implemented by the processor according to an example embodiment may further include: detecting a change in the ambient illuminance of the electronic device, and when the visibility level of the electronic device is changed based on the changed ambient illuminance, changing the AR content corresponding to the target object displayed on at least one of the main display and the sub-display based on the changed visibility level.

The selecting of the target object according to an example embodiment may include tracking a gaze direction of a user wearing the electronic device, and selecting one real object indicated by the tracked gaze direction from among the identified at least one real object as the target object.

The displaying of the outline and the bounding box according to an example embodiment may include detecting an ambient color of the electronic device, and displaying an outline of an area in which the target object is displayed and a bounding box surrounding the outline in a color different from the detected ambient color of the electronic device based on the detected ambient color of the electronic device.

The displaying of the at least one AR content corresponding to the target object according to an example embodiment may include, based on a plurality of real objects being identified, displaying AR content corresponding to each of the plurality of real objects on the main display and displaying AR content corresponding to the target object on the sub-display, and based on the target object being changed, changing the AR content displayed on the sub-display while maintaining the AR content displayed on the main display.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
a sensor configured to measure ambient illuminance of the electronic device;
a display module comprising a main display affected by the ambient illuminance of the electronic device and a sub-display that is less affected by the ambient illuminance of the electronic device than the main display;
a memory configured to store computer-executable instructions; and
a processor including processing circuitry configured to execute the instructions by accessing the memory,
wherein the instructions, when executed by the processor, cause the processor to:
identify at least one real object displayed through the main display,
select one real object from among the identified at least one real object as a target object,
determine a visibility level of the electronic device based on the ambient illuminance of the electronic device,
display a first augmented reality (AR) content corresponding to the target object that is less affected by the ambient illuminance on the main display and a second augmented reality (AR) content corresponding to the selected target object that is more affected by the ambient illuminance on the sub-display based on the determined visibility level.

2. The electronic device of claim 1, wherein the processor is configured to: display AR content corresponding to text related to the target object and AR content corresponding to an image related to the target object on the main display, in response to determining that the visibility level of the electronic device is a first level.

3. The electronic device of claim 1, wherein the processor is configured to: display the AR content corresponding to the text related to the target object on the main display and display the AR content corresponding to the image related to the target object on the sub-display, in response to determining that the visibility level of the electronic device is a second level.

4. The electronic device of claim 3, wherein the processor is configured to: display, on the sub-display, all AR content corresponding to the target object, and display, on the main display, an outline of an area in which the target object is displayed and a bounding box surrounding the outline in addition to the AR content corresponding to the target object, in response to determining that the visibility level of the electronic device is a third level.

5. The electronic device of claim 4, wherein the processor is configured to: display, on the sub-display, the AR content generated based on the text related to the target object and the image related to the target object, in response to determining that the visibility level of the electronic device is the third level.

6. The electronic device of claim 1, wherein the processor is configured to:
detect a change in the ambient illuminance of the electronic device; and
in response to the visibility level of the electronic device being changed based on the change in ambient illuminance, change the AR content corresponding to the target object displayed on the at least one of the main display and the sub-display based on the changed visibility level.

7. The electronic device of claim 1, further comprising:
a first camera configured to track a gaze direction of a user wearing the electronic device,
wherein the processor is configured to select one real object indicated by the gaze direction tracked through the first camera from among the identified at least one real object to be the target object.

8. The electronic device of claim 7, wherein the processor is configured to, in response to the one real object indicated by the gaze direction being maintained for a specified time, select the one real object to be the target object.

9. The electronic device of claim 7, further comprising:
a second camera configured to detect an ambient color of the electronic device,
wherein the processor is configured to: display an outline of an area in which the target object is displayed and a bounding box surrounding the outline in a color different from the ambient color of the electronic device based on the ambient color of the electronic device detected through the second camera.

10. The electronic device of claim 1, wherein the processor is configured to:
in response to a plurality of real objects being identified, display AR content corresponding to each of the plurality of real objects on the main display, and display AR content corresponding to the target object on the sub-display, and in response to the target object being changed, change the AR content displayed on the sub-display while maintaining the AR content displayed on the main display.

11. The electronic device of claim 4, wherein the processor is configured to: determine whether to display the outline of the area in which the target object is displayed and the bounding box surrounding the outline on the main display, respectively, based on an input.

12. A method implemented by an electronic device having a main display affected by ambient illuminance of the electronic device and a sub-display that is less affected by the ambient illuminance of the electronic device than the main display, the method comprising:
   identifying at least one real object displayed through the main display;
   selecting one real object from among the identified at least one real object as a target object;
   determining a visibility level of an electronic device based on ambient illuminance of the electronic device; and
   displaying a first augmented reality (AR) content corresponding to the target object that is less affected by the ambient illuminance on the main display and a second augmented reality (AR) content corresponding to the selected target object that is more affected by the ambient illuminance on the sub-display based on the determined visibility level.

13. The method of claim 12, wherein the displaying comprises:
   displaying AR content corresponding to text related to the target object and AR content corresponding to an image related to the target object on the main display, in response to determining that the visibility level of the electronic device is a first level.

14. The method of claim 13, wherein the displaying comprises:
   displaying AR content corresponding to text related to the target object on the main display and displaying AR content corresponding to an image related to the target object on the sub-display, in response to determining that the visibility level of the electronic device is a second level.

15. The method of claim 1, wherein the displaying comprises:
   displaying, on the sub-display, all AR content corresponding to the target object, and displaying, on the main display, an outline of an area in which the target object is displayed and a bounding box surrounding the outline in addition to the AR content corresponding to the target object, in response to determining that the visibility level of the electronic device is a third level.

16. The method of claim 14, wherein the displaying comprises:
   displaying, on the sub-display, AR content generated based on text related to the target object and an image related to the target object, in response to determining that the visibility level of the electronic device is a third level.

17. The method of claim 12, further comprising:
   detecting a change in the ambient illuminance of the electronic device; and
   in response to the visibility level of the electronic device being changed based on the change in ambient illuminance, changing the AR content corresponding to the target object displayed on at least one of the main display and the sub-display based on the changed visibility level.

18. The method of claim 12, wherein the selecting of the target object comprises:
   tracking a gaze direction of a user wearing the electronic device; and
   selecting one real object indicated by the tracked gaze direction from among the identified at least one real object to be the target object.

19. The method of claim 15, wherein the displaying of the outline and the bounding box comprises:
   detecting an ambient color of the electronic device; and
   displaying an outline of an area in which the target object is displayed and a bounding box surrounding the outline in a color different from the detected ambient color of the electronic device based on the detected ambient color of the electronic device.

20. The method of claim 12, wherein the displaying comprises:
   in response to a plurality of real objects being identified, displaying AR content corresponding to each of the plurality of real objects on the main display, and displaying AR content corresponding to the target object on the sub-display; and
   in response to the target object being changed, changing the AR content displayed on the sub-display while maintaining the AR content displayed on the main display.

* * * * *